United States Patent
Dasgupta et al.

(10) Patent No.: US 11,176,154 B1
(45) Date of Patent: Nov. 16, 2021

(54) COLLABORATIVE DATASET MANAGEMENT SYSTEM FOR MACHINE LEARNING DATA

(71) Applicant: Amazon Technologies, Inc., Seattle, WA (US)

(72) Inventors: Sunny Dasgupta, Redmond, WA (US); Sabya Sachi, Seattle, WA (US); Sri Kaushik Pavani, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/268,382

(22) Filed: Feb. 5, 2019

(51) Int. Cl.
*G06F 9/44* (2018.01)
*G06F 16/25* (2019.01)
(Continued)

(52) U.S. Cl.
CPC .............. *G06F 16/252* (2019.01); *G06F 8/71* (2013.01); *G06F 9/451* (2018.02); *G06F 16/256* (2019.01); *G06N 20/00* (2019.01); *G06F 16/2428* (2019.01); *G06K 9/6215* (2013.01); *G06Q 20/085* (2013.01); *G06Q 30/06* (2013.01); *H04L 63/1433* (2013.01)

(58) Field of Classification Search
CPC .... G06F 16/256; G06F 16/951; G06F 16/288; G06F 16/2428; G06F 16/9538; G06F 16/252; G06F 8/71; G06F 9/451; G06N 20/00; G06N 3/0436; G06Q 30/06; G06Q 30/02; G06Q 20/085; G06K 9/6215; H04L 63/1433; H04L 41/08; H04L 41/5025; C12Q 3/00
See application file for complete search history.

(56) References Cited

U.S. PATENT DOCUMENTS 5,864,875 A 1/1999 Van Huben et al.
6,327,594 B1 12/2001 Van Huben et al.
(Continued)

OTHER PUBLICATIONS

Andrej Karpathy, "Software 2.0", Retrieved from https://medium.com/@karpathy/software-2-0-a64152b37c35 on Feb. 4, 2019, pp. 1-9.
(Continued)

*Primary Examiner* — Tuan A Vu
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a collaborative dataset management system (CDMS) for machine learning (ML) data. In embodiments, CDMS allows many users to create, review, and collaboratively evolve ML datasets. In embodiments, dataset owners may make their datasets available to other users on CDMS for a fee and under specified licensing conditions. CDMS users can search for other users' datasets on the system to use in their own ML tasks. CDMS users may also create child datasets from existing datasets on the system. Parent and child datasets may be linked so that changes to one dataset are provided to the other via merge requests. A dataset owner may use CDMS to review an incoming merge request using one or more audit jobs before approving the request. In this manner, CDMS provides a shared repository and collaboration system for managing high-quality datasets to power machine learning processes.

20 Claims, 24 Drawing Sheets

(51) Int. Cl.
*G06F 8/71* (2018.01)
*G06F 9/451* (2018.01)
*G06N 20/00* (2019.01)
G06Q 20/08 (2012.01)
G06Q 30/06 (2012.01)
G06F 16/242 (2019.01)
H04L 29/06 (2006.01)
G06K 9/62 (2006.01)

(56) References Cited

U.S. PATENT DOCUMENTS

| | | | | |
|---|---|---|---|---|
| 9,356,883 | B1* | 5/2016 | Borthakur | H04L 41/5025 |
| 9,544,327 | B1* | 1/2017 | Sharma | H04L 63/1433 |
| 2014/0188838 | A1* | 7/2014 | Strugov | G06Q 30/02 |
| | | | | 707/710 |
| 2014/0188919 | A1 | 7/2014 | Huffman et al. | |
| 2014/0195466 | A1 | 7/2014 | Phillipps et al. | |
| 2014/0372346 | A1 | 12/2014 | Phillipps et al. | |
| 2015/0379425 | A1 | 12/2015 | Dirac et al. | |
| 2016/0267396 | A1* | 9/2016 | Gray | G06N 20/00 |
| 2016/0358103 | A1 | 12/2016 | Bowers et al. | |
| 2017/0011045 | A1* | 1/2017 | Gershater | C12Q 3/00 |
| 2017/0161643 | A1* | 6/2017 | Hoover | G06Q 30/06 |
| 2017/0371881 | A1* | 12/2017 | Reynolds | G06F 16/256 |
| 2018/0060759 | A1* | 3/2018 | Chu | G06N 20/00 |
| 2018/0204111 | A1* | 7/2018 | Zadeh | G06N 3/0436 |
| 2018/0329799 | A1* | 11/2018 | Pestana | H04L 41/08 |
| 2019/0121807 | A1* | 4/2019 | Boutros | G06F 16/2428 |
| 2019/0171438 | A1* | 6/2019 | Franchitti | G06F 16/9538 |
| 2019/0236460 | A1* | 8/2019 | Jagota | G06F 16/951 |
| 2019/0243836 | A1* | 8/2019 | Nanda | G06F 16/288 |
| 2020/0005168 | A1* | 1/2020 | Bhargava | G06K 9/6215 |

OTHER PUBLICATIONS

Olga Russakovsky, et al., "ImageNet Large Scale Visual Recognition Challenge", International Journal of Computer Vision, 2015, pp. 1-43.

Steve Lohr, "A Lesson of Testa Crashes? Computer Vision Can't Do It All Yet", Rebieved from https://www.nytimes.com/2016/09/20/science/computer-vision-tesla-driverless-cars.html on Feb. 4, 2019, pp. 1-5.

Marco Tulio Ribeiro, et al., "Why Should I Trust You? Explaining the Predictions Any Classifier", arXiv:1602.04936v3, Aug. 9, 2016, pp. 1-10.

* cited by examiner

DASHBOARD 300

WELCOME BACK, Bob!

| FILTER 310 | SORT 312 | COLUMNS 314 | SEARCH 316 | ALERTS 318 |

MY DATASETS: 320

| | | | | |
|---|---|---|---|---|
| CAT IMAGES | Alice | AVAILABLE | PARENT: BIG CATS <br> CHILD: LIONS | 43 contributors <br> Last update: 2 hours ago | License: CDMS-GL <br> Earnings: 89 | ☆☆☆☆☆ (503) |
| MOVIE REVIEWS v2 | Bob | STALE | PARENT: MOVIE REVIEWS | 3 contributors <br> Last update: 1 day ago | License: Bob-Pub <br> Earnings: -5 | ☆☆☆☆☆ (7) |
| CATS AND DOGS | Bob | CREATING | | 1 contributor <br> Last update: 5 days ago | License: Bob-Pub <br> Earnings: 0 | ☆☆☆☆☆ (0) |

WATCHLIST: 330

| | | | | |
|---|---|---|---|---|
| DOG IMAGES | David | AVAILABLE | PARENT: PETS <br> CHILD: POODLES | 28 contributors <br> Last update: 5 hours ago | License: CDMS-GL | ☆☆☆☆☆ (592) |
| MOVIE REVIEWS | Carol | AVAILABLE | CHILD: MOVIE REVIEWS V2 | 12 contributors <br> Last update: 2 days ago | License: CDMS-GL | ☆☆☆☆☆ (780) |
| BIG CATS (*CERTIFIED*) | Ed | AVAILABLE | CHILD: CAT IMAGES | 22 contributors <br> Last update: 3 days ago | License: Public | ☆☆☆☆☆ (444) |

| DETAILS 340 | EXPORT 342 | CONTRIBUTE 344 | WALLET 346 | DISCUSS 348 |

REVIEW MERGE REQUEST _700_

SAMPLE CONFLICTS FOR MERGE REQUEST 1140 (Janice):

| POSSIBLE _731_ | CERTAIN _732_ | IN NEW _733_ | existing sample(s) _741_ | new sample(s) in conflict _742_ match metric _743_
manual audit result _751_
auto audit result _752_

ACCEPT ALL
REJECT ALL
SELECT

VIEW DETAILS _755_

ACCEPT ALL
REJECT ALL
SELECT
AUDIT

FLYING (20000 +)
  └ BIRD (20000 +)
LAND (19900)
  ├ CAT (9950)
  └ DOG (9950)
TOTAL (39900 +)

SHOW AUDIT RESULTS FOR: _750_
☒ TARGET
☐ SOURCE
☐ BOTH

FIG. 7C

DISCUSSION FORUM 900

DISCUSSION FORUM FOR *BIRD-CAT-DOG DATASET*: 910

| THREAD TITLE | THREAD RATING 912 | TAGS 914 | POSTED BY | REPLIES / VIEWS | LAST POST BY |
|---|---|---|---|---|---|
| What does label X mean? | ★★★☆☆ (50) | | Kevin 1/2/19 | Replies: 5<br>Views: 95 | Bob 1/12/19 |
| Is there another bird dataset? | ★★★★☆ (5) | BIRD, ANIMAL | Rick 1/3/19 | Replies: 2<br>Views: 56 | Janice 1/9/19 |
| I have additional dog images | ★★★★☆ (3) | DOG, ANIMAL | Pam 12/20/18 | Replies: 1<br>Views: 40 | Bob 1/5/19 |
| Errors in merge request | ★★★☆☆ (12) | IMAGE | Tom 12/15/18 | Replies: 10<br>Views: 70 | Bob 1/5/19 |

<< < 1 2 3 > >>

SEARCH RESULTS FOR *BIRD, IMAGE*: 920

Hi. Is there another dataset of bird images that that is labeled by species?
Thanks,
Pam Hi Pam.

We have a dataset called "*WILD BIRDS*" that is labeled by species. It contains roughly 300,000 images of birds sourced mostly from photographers. Please take a look and feel free to ask me any questions.

Janice ★★☆☆☆ (10k) *user rating 924*  *answer rating 922* ★★★★☆ (12)  ACCEPTED ANSWER 926

*FIG. 9*

COLLABORATIVE DATASET MANAGEMENT SYSTEM FOR MACHINE LEARNING DATA

BACKGROUND

Machine learning systems for making decisions about digital media are becoming more common. For example, machine-learned image models are increasingly being used in applications such as object recognition, text and speech processing, computer-aided medical diagnosis, autonomous vehicle control, among other areas. Machine learning (ML) excels in domains where it is easier to collect data than to write explicit rules for processing the data. For example, an emerging approach to building software for self-driving cars is to train the machine to learn from examples rather than to explicitly code the machine with complex rules dictating actions for millions of road scenarios. In essence, the ML algorithms transform the data and produce the new-age "code" in the form of machine-learned models. Accordingly, the task of new-age programmers is to curate, maintain, modify, clean and label datasets; not to program the machine explicitly.

In the traditional software development world, a programmer has access to rich selection sophisticated tools at his or her disposal for collaboration. For example, a programmer can use GitHub for code versioning, continuous integration tools such as Jenkins for automated software build and integration, and Gerrit for team code reviews. In the machine learning world, there is a general lack of such collaborative tools to maintain and curate ML data. Typically, ML practitioners must manually version the data and perform primitive data review on such data during long-running training sessions. Moreover, ML practitioners lack automated data sanity checks to facilitate the management of large, evolving datasets. The lack of collaboration tools in the ML development world limits the growth of user communities to collaboratively maintain and curate high quality data repositories for machine learning applications. Such data repositories will lead to faster development times and improved quality for ML applications.

BRIEF DESCRIPTION OF THE DRAWINGS

FIG. 3 depicts an example graphical user interface (GUI) that implements a dashboard view in CDMS, according to some embodiments.

FIGS. 5A to 5E depict example GUIs that provide different views of a dataset managed by CDMS, according to some embodiments.

FIGS. 7A to 7E depict example GUIs that implement a merge request review process in CDMS, according to some embodiments.

FIG. 9 depicts an example GUI that implements a discussion forum view for users in CDMS, according to some embodiments.

Figure 1:
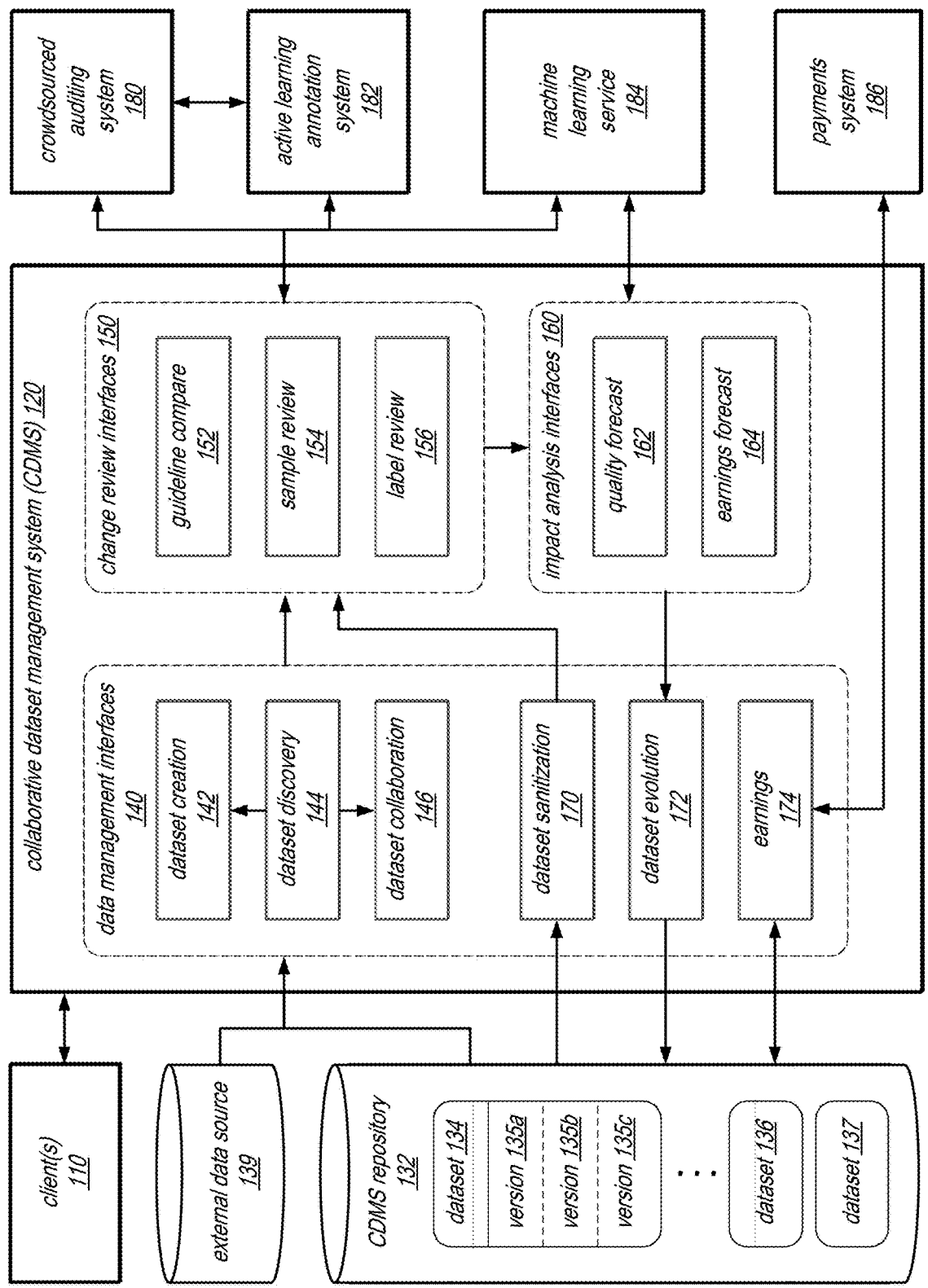
FIG. 1 is a block diagram illustrating an example collaborative dataset management system (CDMS) for storing and managing datasets for developing machine learning (ML) systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a collaborative dataset management system (CDMS) for storing and managing datasets for developing machine learning (ML) systems, according to some embodiments.

Embodiments of the CDMS implements a multi-user and interactive management system for data to be used to develop ML systems. As discussed, the process of collecting, curating, and labeling data for developing ML applications typically requires a significant amount of time and effort. The ML development community currently lacks a set of robust and easy-to-use and collaborative tools to allow data providers to collaborate over these highly time-consuming and labor-intensive tasks. Accordingly, computer systems and associated methods are disclosed herein to implement a collaborative dataset management system for managing machine learning data. In embodiments, CDMS allows many users to create, review, and collaboratively evolve ML datasets. In embodiments, dataset owners may make their datasets available to other users on CDMS for a fee and under specified licensing conditions. CDMS users can search for other users' datasets on the system to use in their own ML tasks. CDMS users may also create child datasets from existing datasets on the system. Parent and child datasets may be linked so that changes to one dataset are communicated to the other via alerts or merge requests. A dataset owner may then use CDMS to review an incoming merge request using one or more audit jobs before approving the merge. In this manner, CDMS provides a shared repository and collaboration system for managing high-quality datasets to power machine learning processes.

In some embodiments, CDMS may be implemented as a standalone computer system or a part or a subsystem within a larger system that supports ML application development. In some embodiments, CDMS may be implemented as a cloud-based service, which may be hosted in a service provider network on computing resources that are owned and managed by the service provider. In some embodiments, CDMS may be implemented alongside or as part of machine learning service, which may also be hosted on the service provider network. Embodiments of the CDMS implement computer functionality that improves upon conventional computer systems for managing ML data, to provide some or all the following benefits.

Data evolution: Many real-world ML systems require large volumes of data enrichment to support their evolution. For example, self-driving cars require frequently updated maps which capture road closures and incorporate new rules. Datasets curated in industry tend to be evolving; however, these datasets are largely proprietary in nature where a single team or an entity maintains control over what data gets added or modified. In contrast, embodiments of the CDMS system provide an open system where many interested entities will be able to contribute to the existing state of a dataset, and thus gradually evolve it based on the effort of a variety of contributors.

Data versioning: In embodiments, every piece of data submitted to the CDMS system will be version-controlled. For example, users of CDMS will be able to retrieve the state of a dataset for any point of time in the past. CDMS may allow users to compare different versions, identify differences, and merge the changes if needed. Versioning of datasets also allows the user to track the development of ML solution and associate different dataset versions with development stages of the ML solution (e.g., development, QA, production, etc.) In embodiments, CDMS also provides versioning tools that gives insight into the data lineage including the origin of particular data and the changes that it underwent over the course of time.

One stop-shop: In some embodiments, CDMS may serve as a central repository for all the datasets created by a large variety of data providers (e.g., magazine publishers, music licensing companies, etc.) In some embodiments, these datasets may be made public or sharable, so that other a variety of data users can use the datasets via CDMS. In some embodiments, users may be able to search for and import the data they are interested in based on specified search criteria. In some embodiments, users may be able to combine multiple data sources and create a custom dataset according to their own requirements.

Easy collaboration: In some embodiments, CDMS enables collaboration among data authors by allowing multiple users to contribute to data creation. Embodiments of CDMS may allow individuals to contribute data to the system via pull or merge requests. Additionally, in some embodiments, CDMS may provide a discussion forum for dataset-specific discussions. The forum may serve as a common repository for frequently asked questions and general discussion, as well as links to other resources on the system.

Data review: In some embodiments, CDMS provides a data review process where in the data added or modified by one contributor is verified by peers and certified for validity. In some embodiments, CDMS may provide certified datasets which have passed certain known quality checks or standards. In addition, in some embodiments, CDMS may provide or enable a rich set of automated review tools to aid user review of data. In some embodiments, such tools may also suggest certain changes to proposed modification, such as new labels for incoming samples to the dataset. In certain domains such as image and text modeling, CDMS may provide saliency maps to help users with their review.

Auto-sanity checks: In some embodiments, CDMS may simplify the ML development process by automatically and/or periodically running audit processes on the data. Embodiments of CDMS may automatically pull in data from existing datasets on the system and running it through customizable machine learning algorithms and validating the current state of data with customizable health metrics. In some embodiments, CDMS may allow users to create and use a set of verification tools (e.g. auto-labelers or sample conflict detectors) to allow users to perform certain types of common audits on datasets.

Debugging: In some embodiments, CDMS may include debugging tools that allow data contributors or data scientists to review the datasets for error. Embodiments of CDMS may present individual samples in ML datasets in a variety of intuitive views, which may help users to quickly identify issues in the data. For example, in some embodiments, CDMS may automatically surface data distribution information and/or identify outliers in datasets by presenting the data in configurable classifications or clusters, so that users can easily detect any potential issues in the data.

Data monetization: In some embodiments, CDMS may enable monetary benefits for both the data owners providing the datasets and the collaborators contributing to the evolution of the datasets. In some embodiments, CDMS users who author or modify datasets will benefit monetarily when their data is accessed by others. Consuming users will be able to search for the data they are interested in to build ML applications using the data. The monetization mechanism provides added incentives for the users on the system to collaborate to create high quality and more sophisticated datasets over time. In some cases, the monetization mechanism may incentivize data owners and tool developers to contribute to the system.

Reputation building: In some embodiments, CDMS may implement user-driven reputation model for both user and data. CDMS users can judge the quality of a particular dataset based on reputation of a user or data while inspecting the data for their use cases, or while considering a pull or merge request to include the particular dataset into their own data. In some embodiments, CDMS may display reputation-related metrics such as a star rating, the names of consumers for a particular data, or a star rating for the data or the contributors to the data. In this manner, trust for data may be increased on the CDMS system.

Graphical user interfaces: The CDMS implements a series of graphical user interfaces (GUIs) that allows users to easily collect, curate, and evolve ML datasets in a collaborative manner. The task of navigating a large database of data sets (e.g., a catalog with millions or billions of data sets) to locate, curate, evolve, collaborate on data sets of interest can be burdensome and time consuming for users, especially if the users do not know the names or generic descriptors of the desired data sets. A user may be able to locate data sets by navigating a browse structure, commonly called a "browse tree," in which the data sets are arranged by category and subcategory. However, the browse tree may include several levels of categories, requiring the user to navigate through several levels of browse nodes or data set pages to arrive at the subcategory of interest. Further, in many cases, the data sets of interest are not accurately or intuitively categorized, requiring the user to perform additional navigation or keyword searching. Thus, the user frequently has to perform numerous navigational steps to arrive at the data set or data set page of interest.

The user interfaces of the type disclosed herein significantly reduce this problem, allowing users to locate, curate, evolve, collaborate on data sets of interest with fewer steps. For example, in the embodiments described herein, CDMS allows users to navigate datasets using labeled according to configurable groupings or clusters. In some embodiments, changes or merge requests may be shown via a series of GUIs to allow the user to quickly review questionable content (e.g., potential data conflicts or labeling errors) and launch spot audits on the data if desired. In some embodiments, CDMS may provide GUIs to compare helpful metadata about datasets (e.g., semantic guidelines about labels) when reviewing merge requests. Beneficially, programmatically identifying data sets of interest and presenting the user with navigational shortcuts to these data sets can improve the speed of the user's navigation through the system, rather than requiring the user to page through multiple other data sets to locate the data set via the browse tree or via conventional searching. These features can be particularly beneficial for computing devices with relatively small screens, where fewer data sets can be displayed to the user at a time and thus navigation of larger volumes of data sets is more difficult.

As may be readily appreciated by those skilled in the art, the CDMS system described herein introduces a number of novel features that improve upon the functioning of conventional ML data management systems, which are not limited to the discussion provided above. Additional features and benefits of the CDMS are described below, in connection with the drawings and their descriptions.

FIG. 1 is a block diagram illustrating an example collaborative dataset management system for storing and managing datasets for developing machine learning systems, according to some embodiments. The CDMS 120 may be implemented on one or more computer systems, for example, a network of connected compute nodes. As shown, in this example, the CDMS 120 is configured to interface with clients 110, which may comprise clients that can access the CDMS 120 over a network such as the Internet. Additionally, as shown, CDMS 120 may interact with a number of resources such as a CDMS repository 132, one or more external data sources 139, and other external systems or services such as a crowdsource auditing system 180, an active learning annotation system 182, a machine learning service 184, and a payment system 186. As may be understood, in different embodiments, CDMS 120 may be configured to interact with different types of systems or services. In some embodiments, some of the systems or services shown as residing outside the CDMS 120 may be implemented instead as part of CDMS. For example, in some embodiments, the CDMS repository 132 may be implemented as a part of CDMS 120. In some embodiments, the CDMS 120 may be implemented as part of one or more larger systems. For example, in some embodiments, the CDMS 120 may be implemented as part of the machine learning service 184. Accordingly, the arrangement of the components shown in the figure is merely illustrative. The relationship of illustrated components may vary depending on the embodiment.

In some embodiments, the CDMS 120 may implement a number of user interfaces, which may be graphical user interfaces (GUIs). In some embodiments, the GUIs may be presented to the clients 110, for example, as generated web interfaces to be displayed using a web browser. These GUIs allow clients or users to interactively manage ML data via the CDMS. As shown, in this example, these GUIs are grouped into data management interfaces 140, change review interfaces 150, and impact analysis interfaces 160.

As shown, in this example, the data management interfaces 140 may include a dataset creation interface 142. In some embodiments, the dataset creation interface 142 may allow users or clients 110 to create datasets to be managed by the CDMS. In some embodiments, datasets may be created by or gathered from external sources, such as external data sources 139. In some embodiments, the CDMS 120 may be configured to managed a variety of different ML data or data samples.

The data samples in CDMS may be used to train or evaluate ML models that are used in ML applications. Depending on the application, ML models may be represented and stored in a variety of ways. In some embodiments, the model may be stored as a data structure that can be easily used by the computer to generate decision output. For example, in some cases, a model may be represented as a vector or a matrix of parameter values. The parameter values may be values that are used in the decision-making process itself, or other metadata used for other purposes. For example, in some cases the model parameters may include one or more values indicating a current confidence level or bound of the model. In some cases, a model may include memory units that store the ongoing state of the modeled subject or values derived from past inputs or outputs. In some cases, computer models may be stored as more complex data structures that specify relationships between the different parameters, such as trees, graphs, neural networks, or the like. In some cases, a model may include a combination of different types of data structures. In some cases, the structure of these models may change over time. In some cases, a model may be embedded as part of a computer-executable program or a set of hardware circuits, which may expose configurable model parameters, and be executed to carry out the decision-making functions of the ML application.

The data samples used to develop these ML models may also take a variety of forms. For example, depending on the application, the data samples may include media samples such as images, audio samples, video samples, textual data, etc. In some embodiments, the media samples may include a collection of input data used to generate one or more ML decisions. In some embodiments, each sample may be associated with existing truth label data, which reflects certain verified or true properties about the sample. For example, in some embodiments, individual image samples may be labeled with one or more class identifiers, to indicate the contents of the image. In some embodiments and depending on the application, label data may include more complicated metadata such as image maps, image segmentation, among other things.

As shown, in some embodiments, a group of media samples may be collected into a dataset and stored in the CDMS repository 132. The CDMS repository 132 may be implemented using a variety of data repositories, depending on the embodiments. In some embodiments, the repository 132 may be implemented using a database that allows for sophisticated querying, such as a SQL or key-value database. In some embodiments, the repository 132 may be implemented as a file-based repository. In some embodiments, the repository 132 may be implemented as a combination of different types of data repositories.

As shown, in some embodiments, the datasets in the repository 132 (e.g. datasets 134, 136, and 137) may be versioned. As shown, dataset 134 may store multiple versions of itself (135*a-c*), as it evolves in the CDMS 120. In some embodiments, every change to a dataset in CDMS may be made via a merge or pull request. Depending on the embodiment, merge or pull requests may be made on a dataset by authorized users, and may include one or more modifications to the dataset, such as changes to the member samples, changes to the sample labels, or other dataset metadata. In some embodiments, whenever a merge is committed or approved for the dataset, a new version of the dataset may be created on top of the existing dataset with a new version identifier. Accordingly, the entire modification history of a dataset may be stored in CDMS, so that users can revert back to an old version of the dataset if desired. In some embodiments, the versions 135 of a dataset may allow for branching, so that a single initial dataset may branch out into several coexisting versions based on divergent modification histories. For example, a dataset may include a first version for a first version of a ML application, and a second version for a second version of the ML application, etc.

The external data source 139 may represent another source of data for the CDMS 120. In some embodiments, the CDMS 120 may be configured to perform some management tasks on external data sources that are not natively part of CDMS. For example, CDMS 120 may be configured to integrate or interact with a remote public datastore of ML data, via the public API exposed by the remote datastore. In some embodiments, the CDMS 120 may be able to perform basic management functions such as reading, writing, and/or searching for data in the external data source 139 via its API. In some embodiments, the external data source 139 may simply be a corpus of unlabeled and unorganized data, such as an Internet data repository. In some embodiments, the CDMS 120 may include import tools to easily load such unorganized data into a dataset in CDMS.

As shown, the data management interfaces 140 may include a dataset creation interface 142. In some embodiments, the dataset creation interface may create an initial version of a dataset in CDMS. In some embodiments, the creation process may involve multiple GUIs to obtain metadata and configuration information about a new dataset from the user.

In some embodiments, the data management interfaces 140 may include a dataset collaboration interface 146. In some embodiments, the collaboration interface 146 may allow different users on CDMS to work on the same dataset, while resolving any conflicts between their modifications. For example, in some embodiments, the collaboration interface 146 may allow a first user to check out a portion of the samples in a dataset for modification, so that other users cannot modify the portion of samples while they are checked out. In this manner, the CDMS provides a mechanism to allow a dataset to be modified by multiple users without the risk of conflicting changes. In some embodiments, the collaboration interface 146 may also implement a cross-dataset merge or pull request interface, so that changes in one dataset can be presented to another dataset to be merged into the other dataset. In some embodiments, the collaboration interface 146 may also implement a number of review interfaces to review merge or pull requests, before the changes are committed.

As shown, in some embodiments, the data management interfaces 140 may include a dataset discovery interface 144. The discovery interface 144 may allow users to browse, search for, or communicate about datasets in CDMS. For example, in some embodiments, datasets may be searched based on its searchable metadata, such as its name, description, one or more search tags, user rating, etc. In some embodiments, a dataset found via a dataset discovery or search may be used as the basis for a dataset collaboration or dataset creation, as shown. For example, a user may search for a dataset of dog images and a dataset of cat images, and combine the two to create a new dataset of dogs and cats.

As shown, the data management interfaces 140 may in some situations invoke one or more of a set of change review interfaces 150. In some embodiments, the change review interfaces 150 may implement one or more GUIs to review a pending change to a dataset. For example, when a merge request is received to a dataset, the owner of that dataset may review the merge request via the change review interfaces 150 provided by CDMS. As another example, when a dataset is created from other datasets, the other datasets may be reviewed for sample conflicts or labeling errors using the change review interfaces 150.

As shown, the change review interfaces 150 may include a guideline compare interface 152. In some embodiments, a dataset may be associated with a specified guideline, which specifies rules to collaborators about the data in the dataset. For example, one dataset about animal images may specify its rules about when an animal is considered a "bird" in that dataset. Such guidelines may be provided to all contributors so that the contributors can all have a common understanding of the labels and sample metadata in the dataset. In some embodiment, when media samples from a source dataset is being merged into a target dataset, the review process may include displaying the guidelines of the two datasets in a comparison view. In some cases, if the guidelines of the two datasets are seen as too different, the merge request may be rejected immediately.

As shown, the change review interfaces 150 may include a sample review interface 154. In some embodiments, the sample review interface 154 allows users to review changes to dataset based on the sample data. For example, in some embodiments, the sample review interface may include a GUI that displays incoming images to be added a dataset and selectively reject any samples that fall outside the scope of that dataset. In some embodiments, the sample review interface may detect, using one or more audit processes, that an incoming image is a nearly identical (or exact duplicate) of an existing image already in the dataset. In some embodiments, CDMS also detects conflicts within the incoming dataset itself and indicates these conflicts on the sample review interface. In some embodiments, the closeness of data samples may be automatically determined based an automated auditing system or a crowdsourced auditing system. In some embodiments, the similarity of two samples may be determined using a similarity or match metric, and a potential conflict may be raised if two samples are determined to be too similar. After potential conflicts are raised, the sample review interface 154 may allow a user (or an auditing system) to selectively remove certain samples from the incoming merge request. In some embodiments, the handling of detected conflicts may be automated as well. For example, embodiments of CDMS may allow the data owner to specify pre-configured rules, which may indicate specific actions to take on specific types of conflicts. For example, if two identical images are detected, CDMS may be configured to automatically discard one image sample without any manual intervention.

As shown, the change review interfaces 150 may include a label review interface 156. In some embodiments, the label review interface may include one or more GUIs to allow users to review the labels of incoming data samples, in cases where a merge request includes labeled samples. In some embodiments, for example, incoming image samples may be audited, either via an automated auditing system or a crowdsourced auditing system, to determine if the labels on the samples are acceptable. In some embodiments, the label review interface 156 may automatically or allow a user to quickly remove incorrect labels on incoming samples. For example, embodiments of the system may present a user interface that groups questionably labeled samples together by label, or sort the samples according to a label confidence metric. The user may then use a simple control element (e.g. a popup menu) to remove or modify the any incorrect labels. In some embodiments, where incoming samples do not have particular labels implemented by the dataset, an auto-labeling system associated with the dataset may automatically label the incoming samples, before they are merged into the dataset. In some embodiments, such automatically labeled samples may also be audited using the system's auditing processes.

As shown, in some embodiments, after an incoming modification or merge request is reviewed via the change review interfaces 150, the modification or merge request may be further analyzed via a set of impact analysis interfaces 160. In some embodiments, these interfaces 160 may forecast one or more impacts on the dataset, as a result of the merge or modification. In some embodiments, these forecasted impacts to the dataset may be determined based on one or more ML applications or tools, based on impacts of past modifications to the dataset, or based on impact of changes to other datasets in the CDMS. In some embodiments, the impact analysis process may be performed using an offline simulation process. In some embodiments, the impact analysis interfaces 160 may be an optional part of the dataset merge process. Thus, depending on the embodiment or configuration, a merge may be applied to a dataset without any impact analysis.

As shown, the impact analysis interfaces 160 may include a quality forecast interface 162. In some embodiments, the quality forecast interface 162 may display one or more configurable metrics that define the health of the dataset. For example, a dataset's health may be defined in terms of a combination of quality metrics such as label accuracy and balance of class distributions, etc. In some embodiments, the quality forecast interface GUI 162 may include one or more user control elements to allow a user to approve or reject a merge or modification request, based on the determined impacts.

As shown, the impact analysis interfaces 160 may include an earnings forecast interface 164. As discussed, in some embodiments, the CDMS may support a monetization mechanism where owners or contributors of a dataset can receive credit based on usage of the dataset by other users on the system. In some embodiments, the amount of credit or payment charged for the usage may be specified as part of a licensing policy of the dataset. In some embodiments, the earnings forecast interface 164 may include GUIs to display how the earnings associated with a dataset may change as a result of a merge or modification. For example, a merge request may involve using a number of data samples from a source dataset (resulting in an ongoing cost), and increasing the number of expected users of the target dataset (resulting in an ongoing increase in revenue). The earnings forecast interface 164 may allow the user to review these impacts when considering to accept or reject a merge or modification request.

As shown, in some embodiments, after the impact analysis interfaces 160 are displayed (and the merge request is approved), the merge request may be applied via a dataset updater, which may be executed or configured via a dataset evolution configuration interface 172. In some embodiments, the dataset updater may include a GUI or API that allows changes to be applied to a dataset. In some embodiments, when a merge or modification is applied by the dataset updater, a new version number or ID is generated for the dataset. In some embodiments, the version number or ID may be specified by the user, which may also indicate whether the version should be added as a branch of the version tree, or indicate which branch the merge should be applied to. In this manner, the versioning of the dataset is automatically managed by CDMS 120.

As shown, in some embodiments, the CDMS 120 may implement a dataset sanitization interface 170. In some embodiments, the dataset sanitization interface 170 may be used to configure a sanitation process associated with a dataset, to perform an ad hoc review of the existing samples in the dataset using the change review interfaces 150 or impact analysis interfaces 160. In some embodiments, the ad hoc review may be performed via a manual request from a user. In some embodiments, the dataset review may be performed regularly or periodically, based on a configured schedule of the data sanitizer. In some embodiments, the data sanitizer may store its review findings in a repository associated with the dataset, for example the CDMS repository 132. In some embodiments, such periodic findings may be later reviewed or analyzed via one or more GUIs of the CDMS, to provide a view of ongoing changes of the dataset over time in terms of measurable metrics such as dataset health and earnings, etc.

As shown on the right, the CDMS 120 may interact with a number of other systems to perform its dataset management tasks. As discussed, depending on the embodiments, some or all of these systems may be implemented as a part of the CDMS, or the CDMS may be implemented as part of some or all of these systems. As shown, the crowdsourced auditing system 180 may be configured to present a specified auditing task to human users, and then allow the human users perform the auditing task and provide their decisions. For example, such a system may be used to obtain 50 human reviews of an image sample to answer a particular question. In some embodiments, the crowdsourced auditing system may provide a credit or fee to the humans who choose to perform the requested auditing task.

As shown, an active learning annotation system 182 is another system that may be used by the CDMS 120. In some embodiments, the active learning annotation system 182 may be a hybrid system that allows one or more humans to perform a particular task, while at the same time training an active learning ML model to perform the task based on the observed decision of the humans. Thus, for example, one or more humans may be used to label or annotate a set of images, and the active learning model may observe the humans' choices until it can approximate the humans' choices to a satisfactory level. In some embodiments, once the satisfactory level is reached, the active learning model may take over the annotation of all remaining images. As shown, in some embodiments, the human teachers of the active learning system may be assigned from the crowd-sourced auditing system 180. In some embodiments, the active learning system 182 may be used to perform manual tasks other than annotation. For example, in some embodiments, the active learning system 182 may be trained to automatically determine if two samples are in conflict, or whether certain sample labels are incorrect.

As shown, the CDMS 120 may also use a machine learning service 184. In some embodiments, the machine learning service 184 may host a plurality of ML models, which may implement management tools for the CDMS 120. For example, a dataset may be associated with a particular auto-labeling tool, to quickly apply labels to a set of new data samples. In some embodiments, such ML applications are trained, hosted, and executed in the machine learning service 184. In some embodiments, active learning systems such as the active learning annotation system 182 may also be hosted and trained in the machine learning service 184. In some embodiments, the machine learning service may be implemented on an in-the-cloud service provider network, where the hardware or computing resources used by the hosted ML models are supplied by the service provider, so that clients of the machine learning service do not have to operate their own hardware resources for the machine learning tasks.

As shown, the CDMS 120 may implement an earnings interface 174. As discussed, in some embodiments, the CDMS may support a monetization mechanism where owners or contributors of a dataset can receive credit based on from other users of the dataset. In some embodiments, the amount of credit or payment may be specified as part of a licensing policy of the dataset, and enforced using the earnings calculator. In some embodiments, individual users (or datasets) may each have an associated credit account, and credits within these accounts are automatically adjusted based on specified policies and usage data. For example, in some embodiments, the CDMS may permit an earnings policy that charges users of a dataset on an ongoing basis (e.g., once a month). Accordingly, the earnings interface 174 may be used to view or configure a user's earnings in the CDMS.

As shown, in some embodiments, the earnings interface 174 may interact with a payments system 186. In some embodiments, the payments may occur purely using credits within CDMS 120. In some embodiments, the payments may actually involve the transfer of real money. In such embodiments, the earnings calculator may communicate with the payments system 186 (e.g. a system operated by a bank or payment processor) in order to implement the payments transfers in CDMS.

Figure 2:
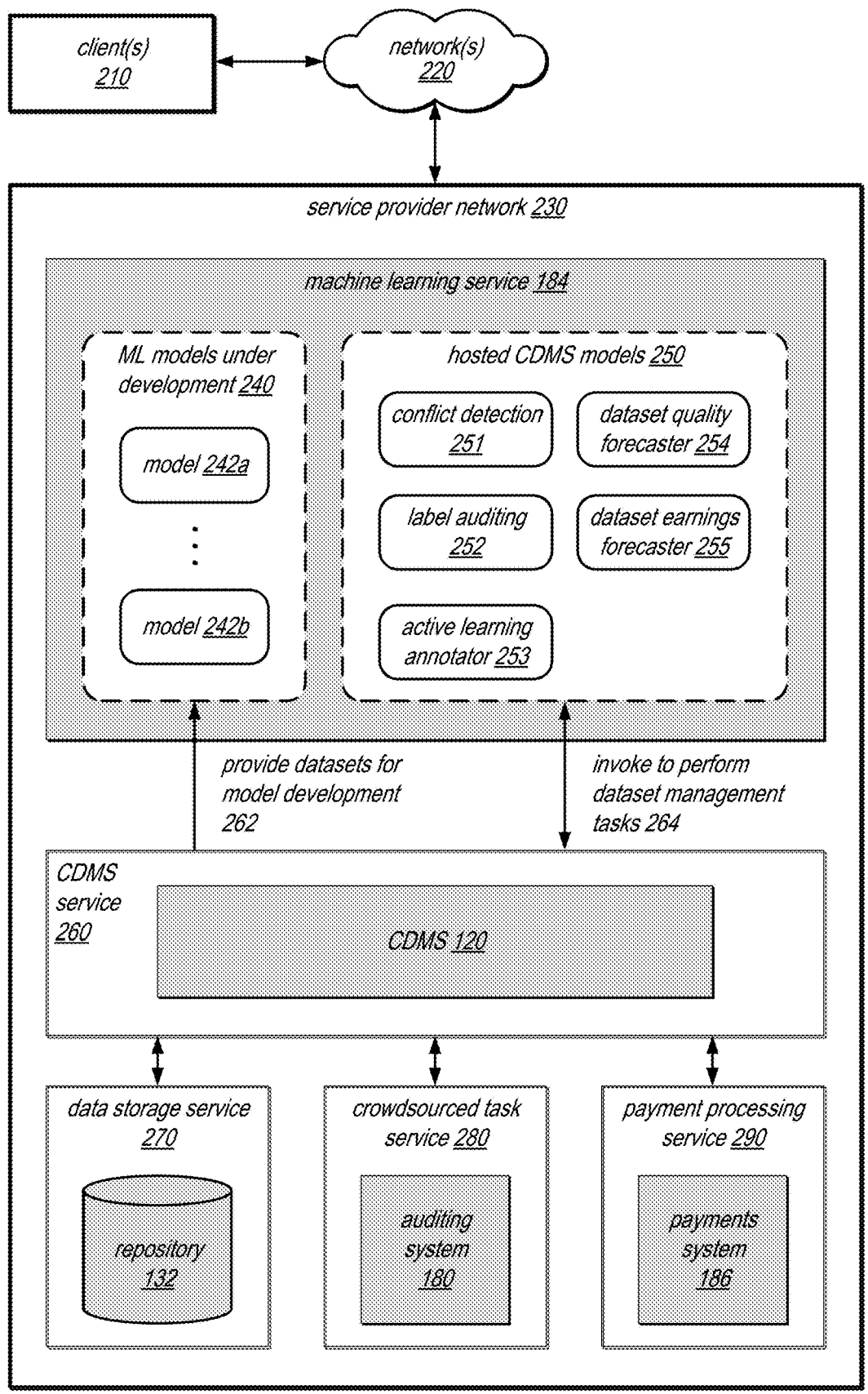
FIG. 2 is a block diagram illustrating an example implementation of CDMS as a service in a network-based service provider network, according to some embodiments.

FIG. 2 is a block diagram illustrating an example implementation of CDMS as a service in a network-based service provider network, according to some embodiments. As shown, in some embodiments, the CDMS 120 as discussed in FIG. 1 may be implemented as a service 260 provided by a service provider network 230. In some embodiments, the service provider network 230 may be a cloud-based service provider system that is accessible via networks 220 by clients 210.

In some embodiments, the service provider network hosting the CDMS service 260 may provide computing resources via one or more computing services to the client(s) 210. The service provider network and CDMS service may be operated by an entity to provide one or more services, such as various types of cloud-based computing or storage services, accessible via the Internet and/or other networks to client(s) 210. In some embodiments, the service provider network or CDMS may implement a web server, for example hosting an e-commerce website. The service provider network may include numerous data centers hosting various resource pools, such as collections of physical and/or virtualized computer servers, storage devices, networking equipment and the like, needed to implement and distribute the infrastructure and services offered by the service provider network. In some embodiments, the service provider network may provide computing resources to clients. These computing resources may in some embodiments be offered to client(s) 210 in units called "instances," such as virtual compute instances.

The client(s) 210 may encompass any type of client configurable to submit requests to the service provider network. In some embodiments, the clients 210 may be the clients 110, as discussed in connection with FIG. 1. In some embodiments, a given client 210 may include a suitable version of a web browser or may include a plug-in module or other type of code module configured to execute as an extension to or within an execution environment provided by a web browser. Alternatively, a client 210 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 210 may be configured to generate network-based services requests according to a Representational State Transfer (REST)-style network-based services architecture, a document- or message-based network-based services architecture, or another suitable network-based services architecture. In some embodiments, the service provider network or CDMS may offer its services as web services, and the client(s) 210 may invoke the web services via published interfaces for the web services. In some embodiments, a client 210 (e.g., a computational client) may be configured to provide access to certain aspects of the CDMS in a manner that is transparent to applications implemented on the client(s) 210 utilizing computational resources provided by the service provider network.

In some embodiments, the client(s) 210 may convey network-based services requests to the service provider network or CDMS service 260 via network 220. In various embodiments, network 220 may encompass any suitable combination of networking hardware and protocols necessary to establish network-based communications between clients 210 and service provider network 230. For example, a network 220 may generally encompass the various telecommunications networks and service providers that collectively implement the Internet. A network 220 may also include private networks such as local area networks (LANs) or wide area networks (WANs) as well as public or private wireless networks. For example, both a client 210 and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the client 210 and the Internet as well as between the Internet and service provider network. In some embodiments, client(s) 210 may communicate with service provider network or CDMS service using a private network rather than the public Internet.

As shown, a number of the systems and/or services discussed in connection with FIG. 1 may be implemented as services within the service provider network 230. As shown, the CDMS 120 in this example is implemented as a CDMS service 260. In this example, the CDMS repository 132 may be implemented as a data storage service 270 hosted on the service provider network. In this example, the crowdsourced auditing system 180 may be implemented as a generalized crowdsourced task service 280 implemented on the service provider network. In this example, the payments system 186 may be implemented as a payments processing service 290 on the service provider network. In some embodiments, the CDMS service 260 may integrate with external systems or services such as the machine learning service 184, the data storage service 270, the crowdsourced task service 280, and the payment processing service 290 via respective external system interfaces. For example, in some embodiments, the CDMS service 260 may invoke functionality or provide data to the machine learning service 184 via an API of the machine learning service. In some embodiments, the CDMS service 260 may provide data to the machine learning service by granting access to the machine learning service. In some embodiments, the machine learning service may expose certain functionalities of the CDMS in its own user interfaces, so that the machine learning service can invoke functions in CDMS.

As shown, the machine learning service 184 of FIG. 1 may be implemented a hosted service of the service provider network 230. In some embodiments, the machine learning service 184 (MLS) may be configured with resources and tools to carry out a variety of machine learning tasks, such as training, evaluation, hosting, and execution of machine learning models. In some embodiments, as shown, the CDMS 120 may use the MLS 184 in at two different ways.

First, as shown, the CDMS 120 may provide 262 ML data to ML models under development 240 hosted in the MLS. Thus, for example, a user developing a ML model for animal recognition in image data (e.g. model 242a or 242b) may use data from the CDMS 120 to train or evaluate the ML model. In some embodiments, the CDMS 120 may be exposed as an API or GUI within MLS 184, so that users of the MLS can easily select or import data in CDMS 120 to be used to the MLS. In some embodiments, the user interfaces of the CDMS may also be exposed in MLS, so that users can perform data management tasks in CDMS directly from MLS.

Second, as shown, the CDMS 120 may rely on MLS to host some of its tools, which as implemented as hosted CDMLS models 250. In some embodiments, these tools or ML models 250 may be associated with individual datasets. In some embodiments, these ML models or tools may be made available as generalized or public management tools within CDMS. In some embodiments, management tasks may be defined or configured in CDMS to specifically invoke 264 particular models 250 in MLS to performed the management task.

As shown, in some embodiments, the CDMS models 250 may include a conflict detection model 251. Such a model 251 may be used to generate data displayed on the sample review 154, for example, to indicate potential conflicts in incoming data samples. As shown, the label auditing model 252 may be trained to review the correctness of certain labels attached to data samples. In some embodiments, the active learning annotator 253 may implement a model that supports the active learning annotation system 182 of FIG. 1, which may be used to perform annotations of samples first based on human input, and then based on the active learning model trained using the human input. As shown, the dataset quality forecast may be a ML model that is trained to generate forecasts of quality metrics for a dataset, which may be used to generate the quality forecast interface 162. As shown, the dataset earnings forecaster 255 may be a ML model that is trained to generate earnings forecasts for a dataset, which may be used to generate the earnings forecast interface 164. In some embodiments, other types of ML model may be used to make different types of decisions or generate different types of metrics for the dataset. In some embodiments, some of the models 250 may also generate confidence measures as part of their output (e.g., confidence intervals or probabilities, etc.). In some embodiments, these models may be created and hosted for the CDMS by the MLS, in order to provide a rich set of data management tools in the CDMS.

FIG. 3 depicts an example graphical user interface (GUI) that implements a dashboard view in CDMS, according to some embodiments. In some embodiments, the dashboard view 300 may be implemented as one of the data management interfaces 140 of FIG. 1.

In some embodiments, the dashboard view 300 may be a GUI initially displayed by the CDMS when a user logs onto the CDMS system. In this example, the user is Bob, and the dashboard view greets Bob by name. As shown, the dashboard view 300 may list a number of datasets that user Bob may subscriber to. For example, under the MY DATASETS section 320, the view 300 may list a number of datasets that Bob can modify. In some embodiments, a user can modify a dataset if he or she is the owner or creator of the dataset, or if the user belongs to a group that is allow to contribute to the dataset. As shown, the datasets are listed showing a number of properties. For example, the second column may indicate the owner or creator of the dataset. In this example, each dataset may also indicate a status, which indicates whether the dataset is available for use, stale, being created, or some other type of status. In this example, each dataset may also indicate any parents or children datasets. In some embodiments, parent datasets may be those datasets that a given dataset has inherited from (e.g., created from or received merge input from), and children datasets are those that a given dataset has provided input to (e.g., during creation or in a merge). In this example, the datasets may be displayed with the number of contributors that are authorized to or have contributed to the dataset, as well as the timing of the last update to the dataset. In this example, the datasets may be displayed with a license, which specifies use conditions for the dataset, as well as the amount earnings that has been received for the dataset. Finally, in this example, the datasets may be displayed with an average user rating (e.g., in terms of stars) and the number of users that have provided a rating. As shown, another list of datasets may be shown under the WATCHLIST section 330. In some embodiments, this section may list datasets that are observed by Bob, but which cannot be modified by Bob. As shown, the third dataset in the WATCHLIST section 330 indicates that the BIG CATS dataset is "certified." In some embodiments, datasets may be certified by one or more other users, groups, entities, or the CDMS system itself, using well-known auditing procedures. In some embodiments, these certifications may increase the trustworthiness of the dataset to users on the CDMS system.

In some embodiments, the display settings of the dashboard view 300 may be configurable. For example, the datasets shown may be filtered based on one or more filtering criteria, which may be configured via button 310. The displayed datasets may also be sorted based on sorting criteria, using the button 312. In some embodiments, the display columns may be changed, via button 314. In some embodiments, a search for datasets in the CDMS may be performed via a search button 316. In some embodiments, the CDMS may provide an alert mechanism to provide to individual users alerts from the system. For example, alerts may include messages from other users, changes in other watched datasets, merge requests from other users, etc. Such alerts may be accessed via button 318.

As shown, in some embodiments, the view 300 may allow users to select a particular dataset in one of the lists, and perform specific actions on that selected dataset. In this example, the CATS AND DOGS dataset is selected, and the user may perform actions on that dataset via buttons on the bottom of the view. For example, button 340 may generate another GUI to view more detail information (such as definition and configuration information) about the selected dataset. The detail information may also include current status and various metrics about the dataset, which may change over time. The EXPORT button 342 may allow user to export the selected dataset in a standardized format, or to a known ML development system, to be used to perform ML tasks. The CONTRIBUTE button 344 may generate one or more GUIs to allow the user to contribute to the selected dataset, for example, via one or more collaboration requests or operations. In addition, in this example, a number of buttons are provided to perform actions that are not dependent on any selected dataset. For example, the WALLET button 346 allows the user to see his credits on the CDMS system. In some embodiments, the system may provide individual users with a credit account. Users may use his or her credit to purchase data from the datasets of other CDMS users, and may also earn credit by allowing other users to use his or her data on the system. Finally, as shown, the DISCUSS button 348 may allow users to view discussions in a discussion forum in CDMS. The discussion forums may allow system users to promote their datasets to other users or ask questions about datasets on the system.

FIGS. 4A to 4D depict example GUIs that implement a dataset creation process in CDMS, according to some embodiments. In some embodiments, these GUIs may be implemented as dataset creation GUIs 142, as discussed in FIG. 1. In some embodiments, these GUIs may implement a sequential workflow to create datasets in CDMS.

Figure 4A:
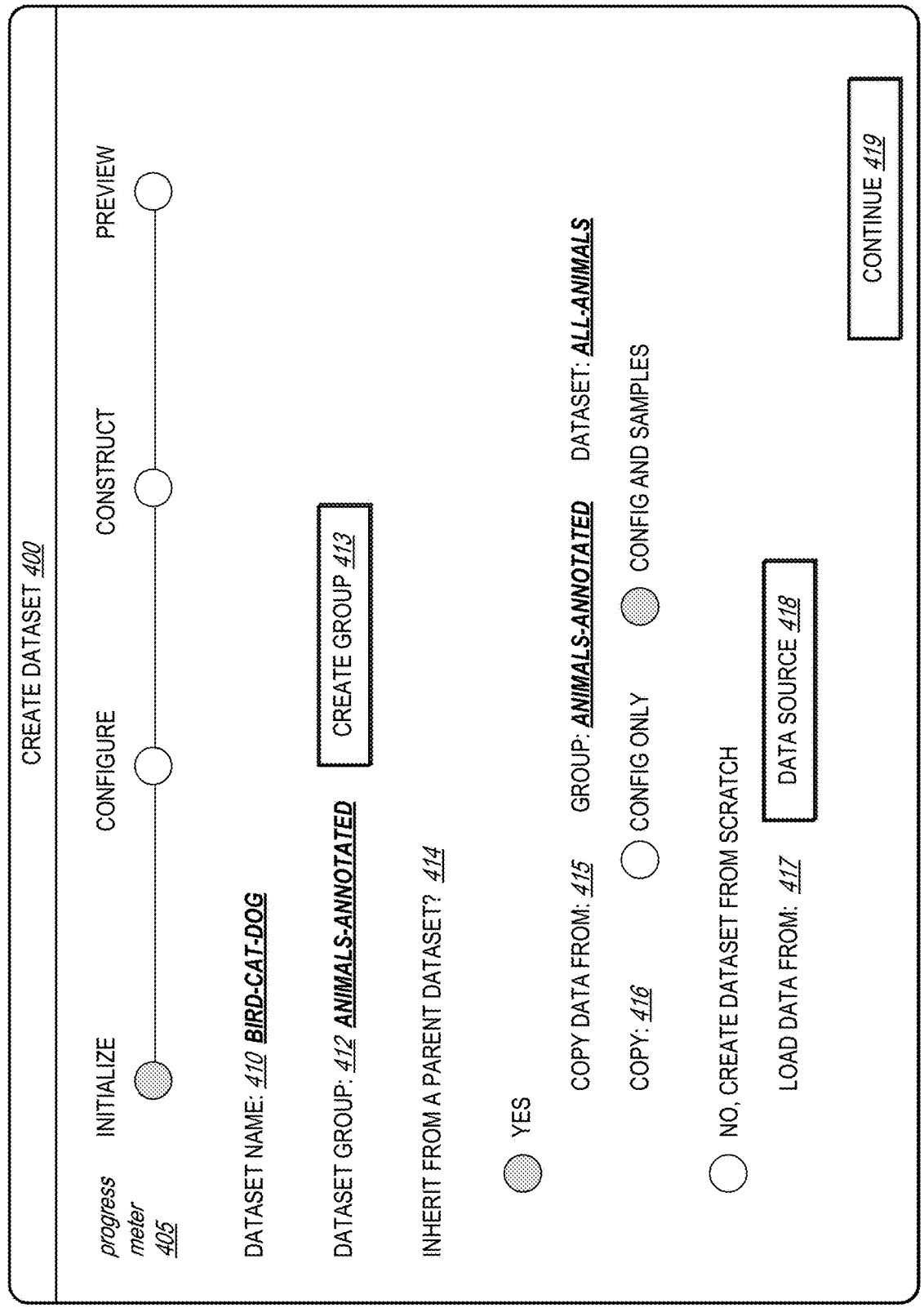
FIGS. 4A to 4D depict example GUIs that implement a dataset creation process in CDMS, according to some embodiments.

As shown, FIG. 4A depicts a create dataset view 400. In this example, the view 400 may change as the user progresses through the dataset creation process, taking the user to subsequent steps in the process. As shown, the top of the view 400 indicates a progress meter 405, which shows the current place in the creation process. In this example, the dataset creation process includes four steps.

As shown, in this step, the user specifies a name for the dataset in field 410, and a group for the dataset in field 412. In some embodiments, datasets may be grouped to provide common control over the group. For example, a group of developers may group their datasets in a common group, so that access to these datasets may be enforced collectively, or earnings for the datasets may be aggregated together. Button 413 may allow the user to create a new group for the dataset.

As shown, section 414 in this example allows the user to specify parameters to inherit the dataset from an existing dataset in the CDMS system. In this example, the parent dataset to inherit from is selected in field 415, and field 416 specifies that both configuration metadata and the actual samples in the parent dataset ALL-ANIMALS are to be copied to the newly created dataset BIRD-CAT-DOG. In some embodiments, this dataset creation view 400 may be generated directly from a view displaying information about the parent dataset. As shown, the dataset may also be created without a parent dataset, from scratch. In that case, fields 417 and 418 allows the user to specify a data source to load data samples from. In some embodiments, the data to load may be labeled data in a standard format. In some embodiments, the data to load may simply be raw, unlabeled that, which may require additional processing. The continue button 419 in this example may take the user to a next step of the dataset creation process.

Figure 4B:
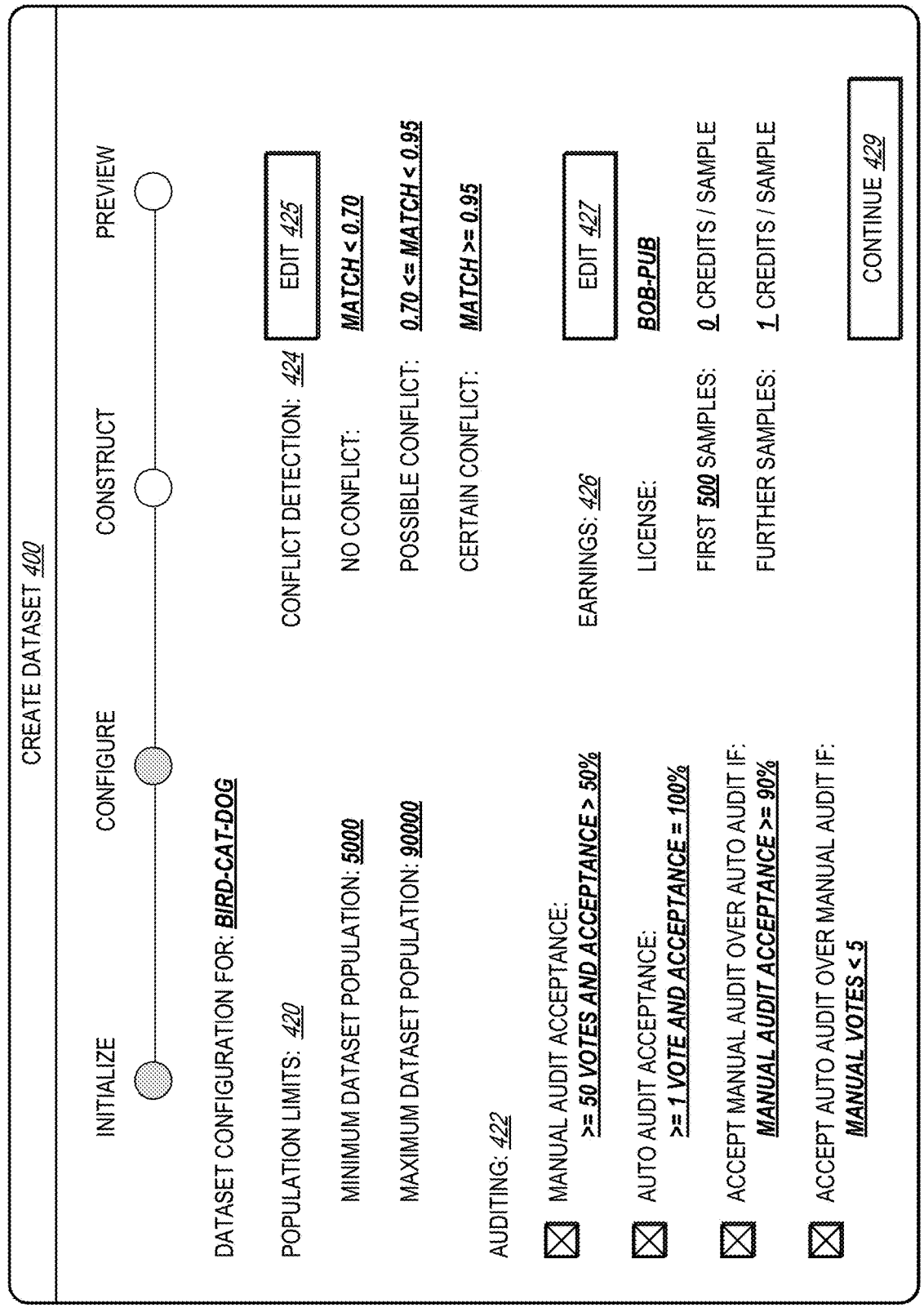

FIG. 4B depicts a next step in the dataset creation process, where certain configuration information about the dataset is specified. As shown, in this step, certain population limits for the dataset are specified under section 420. In this example, a number of auditing settings and rules are set under section 422. For example, this dataset will enable both manual and automated auditing processes, and the acceptance and override criteria for the two auditing processes are specified. As shown, section 424 specifies certain parameters of the conflict detection process for this dataset. In some embodiments, the conflict detection may be an automated process performed on incoming data samples, and custom types of conflicts may be defined for each dataset, for example via button 425. In this example, a conflict occurs when there is a close "match" between two data samples. In this example, detected conflicts are separated into three categories, as shown, based on the match or similarity metric. As discussed, in some embodiments, this metric may be computed from a ML application, which may be a data management tool associated with the dataset. Finally, as shown, section 426 specifies a number of earnings parameters for the dataset, which may be edited via button 427. Here, the configuration information may include the usage license for the dataset, and a formula or rules that specify how much certain usages of the dataset cost.

Figure 4C:
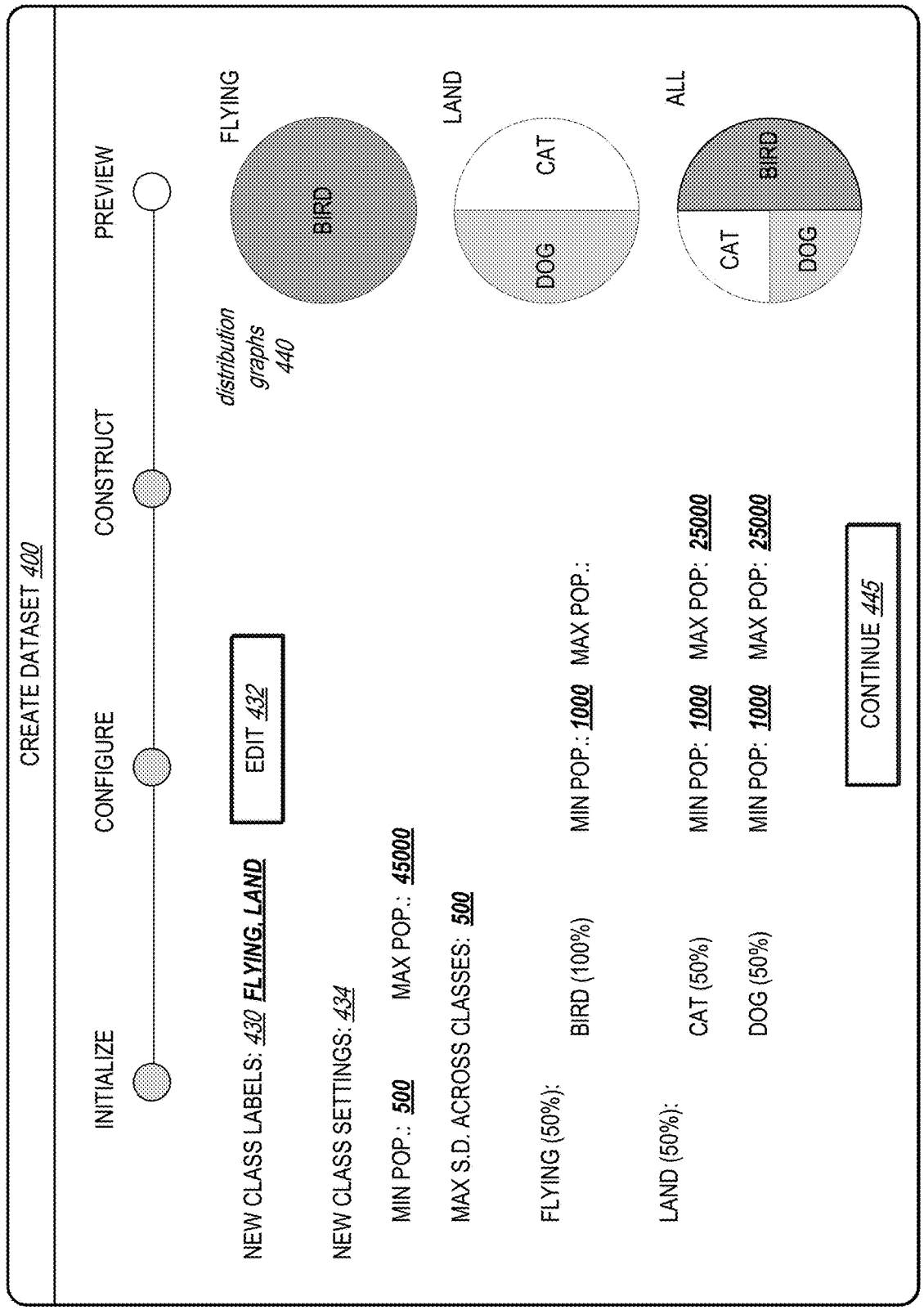

FIG. 4C depicts a next step in the dataset creation process. In this step, a set of new class labels are constructed for the dataset. As shown, field 430 indicates that new labels FLYING and LAND are to be applied to incoming data samples in the BIRD-CAT-DOG dataset to be created. As shown, under section 434, a number of size and distribution limits specified for the dataset. Additionally, in this example, the new label FLYING and LAND are simply to be applied according to the existing labels of the incoming data samples, BIRD, CAT, and DOG. Thus, as shown, the entire dataset will be constructed to include 50% FLYING samples and 50% LAND samples. The FLYING class label will include 100% BIRD samples, and the LAND class label will include approximately 50% CAT and 50% DOG samples. These distributions are shown in distribution graphs 440 on the right, in this example. In some embodiments, unlabeled incoming data may be labeled using more sophisticated tools. For example, in some embodiments, an auto-labeling tool (e.g., a ML application) may be provided with the dataset, so that all incoming images can be initially labeled based on the auto-labeling tool. In some embodiments, an active learning annotation tool may be used to supply the labels.

Figure 4D:
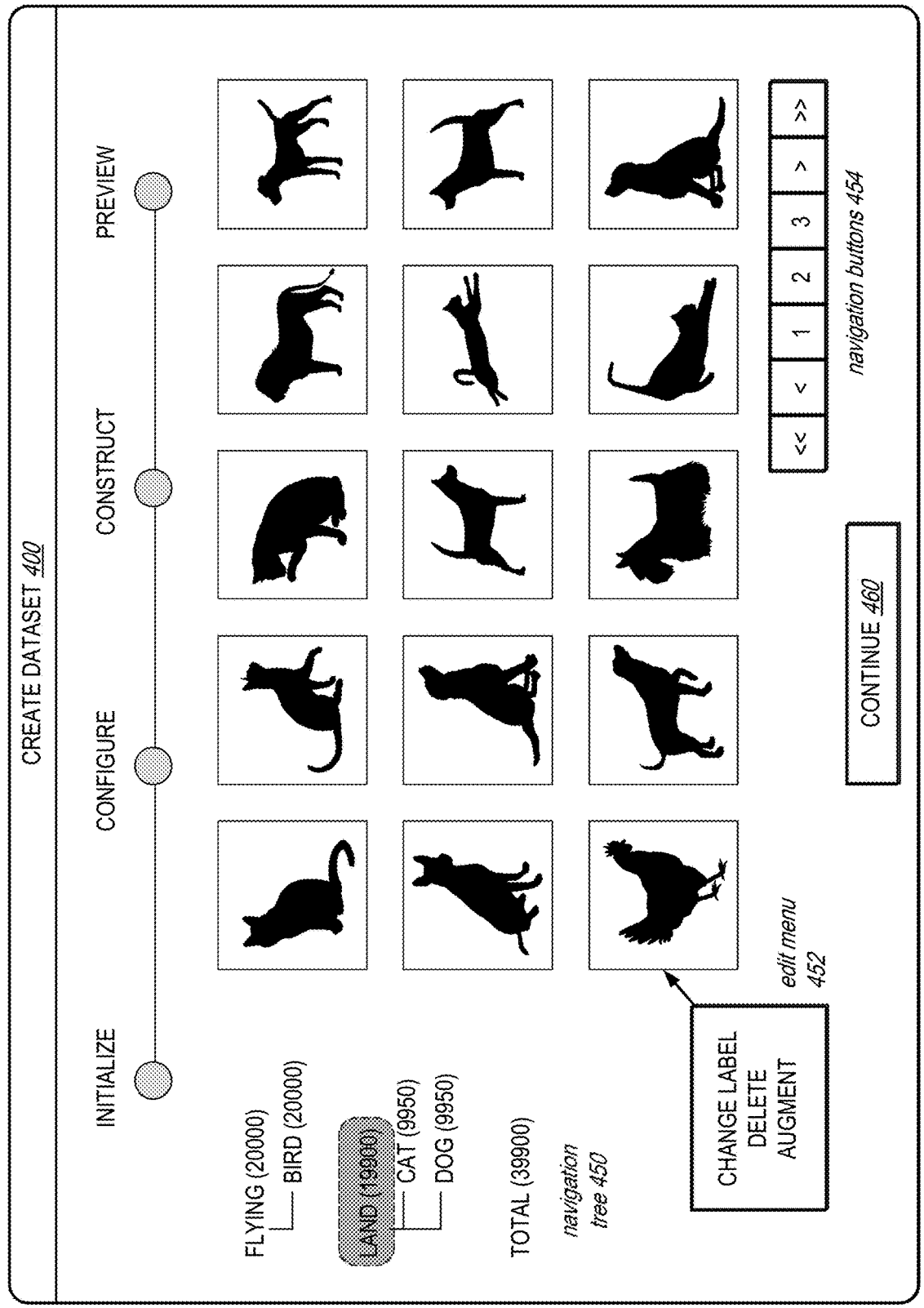

FIG. 4D depicts a next (in this example the last) step in the creation process. In this step, the view 400 displays all (or a sample) of the data samples in the dataset to be created. Depending on the media type of the dataset, this previewing of samples may be implemented differently. As shown, in this view, a navigation tree 450 is shown on the left side, which shows the hierarchy and counts of the labels or classes in the dataset. In some embodiments, the navigation tree can be manipulated to select different subgroups within the dataset. In some embodiments, the structure of the tree may be configured via the GUI. As shown, the view 400 includes navigation buttons 454, which may allow the user to page through the data samples in this example. In this example, the user may also use an edit menu 452 (which may be a right-click popup menu in some embodiments) to perform certain actions on a particular sample. For example, a user may change the label of a particular sample, delete a particular sample, or augment a particular sample by auto-generating variation of a sample. Other types of actions may be implemented in other embodiments. Finally, in this example, the CONTINUE button 460 will cause the BIRD-CAT-DOG dataset to be created in CDMS. Accordingly, by using these dataset creation GUIs as shown, the CDMS provides the user an intuitive dataset creation process that can quickly and painlessly create a dataset for ML tasks.

FIGS. 5A to 5E depict example GUIs that provide different views of a dataset managed by CDMS, according to some embodiments. In some embodiments, these GUIs may be implemented as part of the data management interfaces 140, as discussed in FIG. 1. In some embodiments, these GUIs may be used to view the metadata and configuration information for a single dataset in CDMS.

Figure 5A:
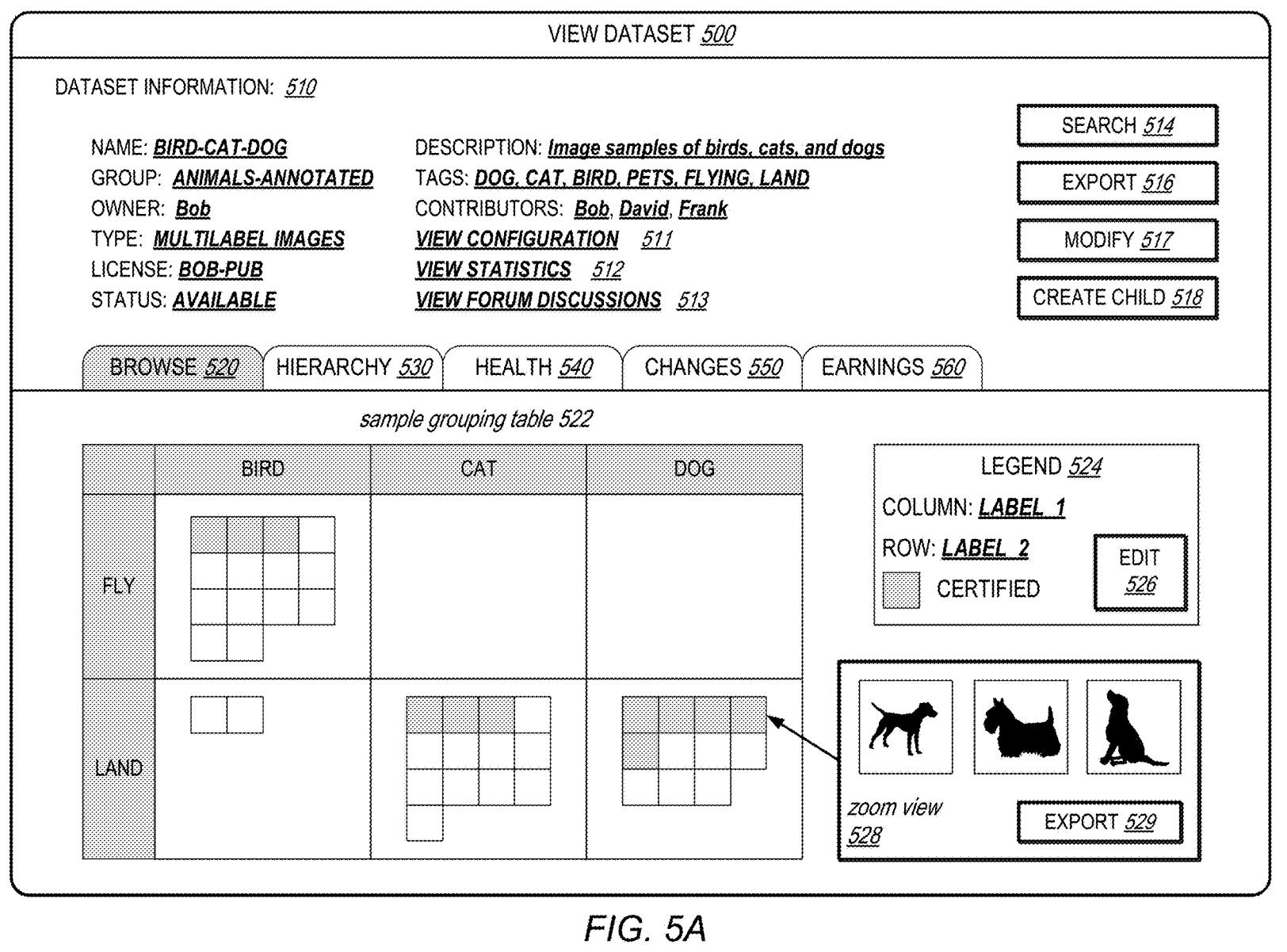

As shown, FIG. 5A depicts a view dataset view 500. In this example, the view 500 may include a number of tabs 520, 530, 540, 550, and 560, that allows the user to view different aspects of the dataset (BIRD-CAT-DOG in this example).

As shown, the top of the view 500 display a section 510 of basic information about the dataset. In this example, this information includes the dataset's name, group, owner, type, license, status, description, tags, and contributors, as shown. In some embodiments, some of the displayed values may be clickable (e.g. as HTML links) in order to display additional information about that value. For example, the license may be clickable to display the details for the dataset license. Each user displayed may be clickable to display data associated with the user.

Additionally, as shown, section 510 includes other clickable items 511, 512, and 513 and allows the user to view additional information about the dataset. In this example, the VIEW CONFIGURATION link 511 may allow the user to view the full configuration data of the dataset. The VIEW STATISTICS link 512 may allow the user to view the label grouping, label distributions, population counts in the dataset. Moreover, the VIEW FORUM DISCUSSIONS link 513 may allow the user to see all discussion threads in a CDMS forum either mentioning the dataset or associated with the dataset.

In addition, as shown, section 510 also includes a number of user control elements (e.g. buttons) that allows the user to perform actions on the dataset. In this example, the SEARCH button 514 may allow the user to search for specific items or samples in the dataset (e.g., based on a keyword or a tag). As shown, the EXPORT button 516 may allow the user to export some selection of the dataset's samples to be used for ML tasks or for other purposes. The MODIFY button 517 may allow the perform certain modifications on the metadata or samples in the dataset. In some embodiments, the MODIFY button 517 may initiate a GUI to define a collaboration request. Finally, in this example, the CREATE CHILD button 518 allows the user to create a child dataset from the current dataset. For example, button 518 may invoke the view 400, as shown in FIG. 4A.

As shown, in this example, the first tab 520 of the view 500 is selected. In this BROWSE tab 520, a sample group table 522 is shown. In some embodiments, this table 522 may provide a global view of all data samples in the dataset. In this example, the entire dataset is separated into six cells, which are defined according to the labels in the dataset. In this example, the structure of the table is explained in the legend 524, and the structure may be configured via the EDIT button 526. In some embodiments, the table 522 may provide a drilldown view of the samples in the dataset grouped by the labels or other sample characteristics. In some embodiments, the view 500 may allow the user to define a custom clustering process (e.g., based on the samples' extracted feature vectors), and display the samples grouped according to their cluster.

As shown, in this example, the table 522 also provides a zoom view 528, which may appear via a right click on a cell. In some embodiments, the zoom view may provide an enlarged or more detailed view of individual samples in the selected cell of the table. Accordingly, the table 522 allows users to quickly see the details on certain samples, without losing perspective on the larger dataset. In some embodiments, as shown, the zoom view 528 may allow the user to select particular samples in a cell, and perform certain actions on the selected samples. For example, the view 528 may allow users to export 529 only some selected samples in the dataset. In this manner, the table 522 provides a fast and easy way to visually select samples from the dataset for actions.

Figure 5B:
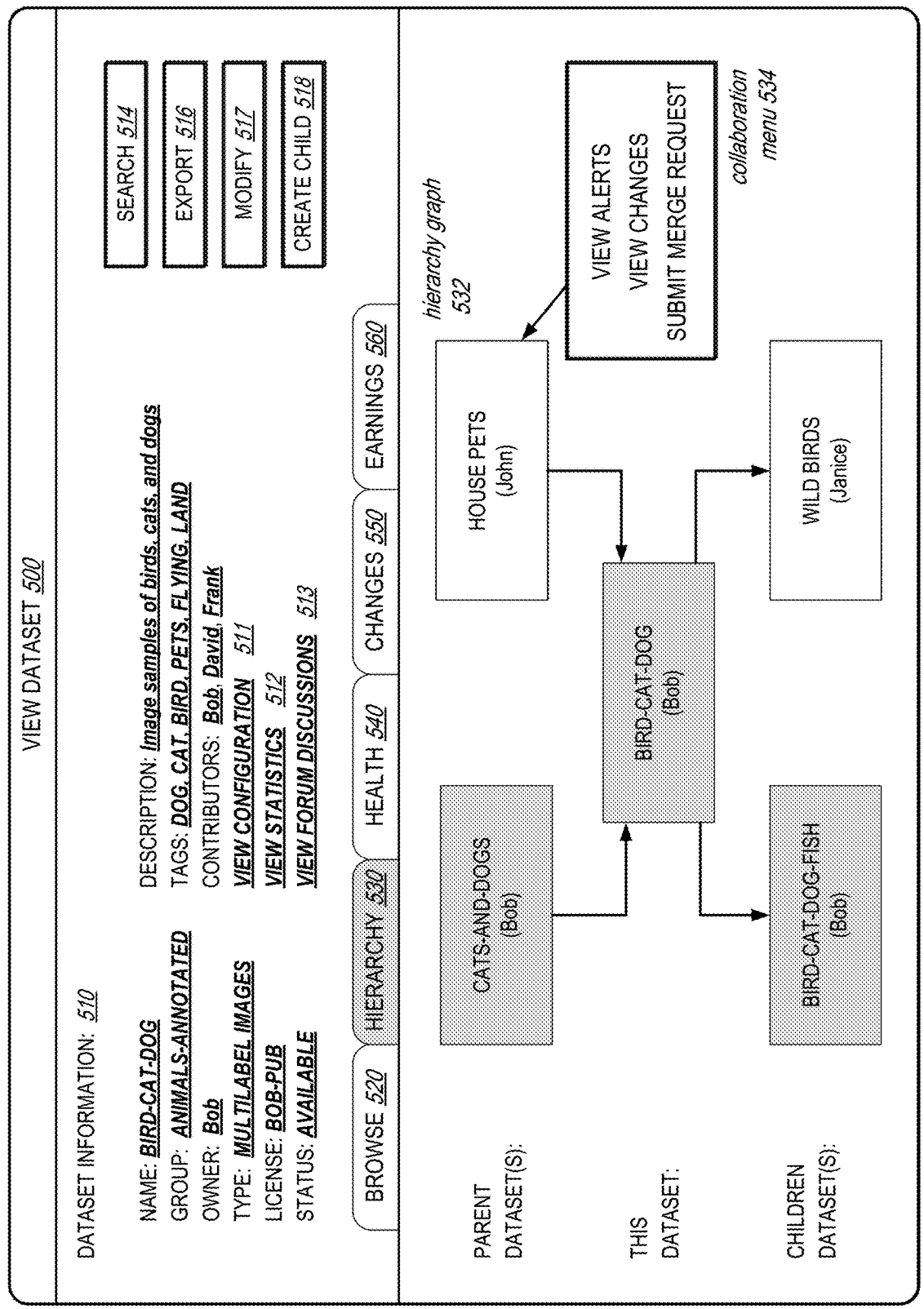

As shown, FIG. 5B shows view 500 with tab 530 selected. As shown, in this GUI, the basic information 510 remains visible. In the HIERARCHY tab 530, the parent and children datasets of the current dataset (BIRD-CAT-DOG) are displayed. As discussed, in some embodiments, the CDMS maintains metadata about parent and children relationships datasets managed by CDMS. In some embodiments, a parent dataset to a given dataset may be a dataset that contributed to the given dataset, either when the given dataset is created or sometime after. In some cases, the given dataset may only inherit metadata or configuration data from the parent dataset. In some cases, the given dataset may inherit some data samples and/or labels from the parent dataset. Conversely, a child dataset to a given dataset is a dataset that received contributions from the given dataset, either when the child dataset is created or sometime after. In some embodiments, contributions from one dataset to another in CDMS may be performed via merges, which may be specified in a merge request indicating changes (e.g. new data samples or modifications to data samples or configuration information). In some embodiments, the merge requests may be reviewed via a review process at the receiving dataset.

As shown, in this example, the dataset BIRD-CAT-DOG is shown in a hierarchy graph 532, which displays two parent datasets (CATS-AND-DOGS and HOUSE PETS), and two children datasets (BIRD-CAT-DOG-FISH and WILD BIRDS). In this example, the respective owners of these datasets are also shown, and those datasets owned by the same owner as BIRD-CAT-DOG (Bob) are shown in a common color. In some embodiments, the datasets shown may indicate pending merge requests to or from the current dataset. In some embodiments, the datasets shown may indicate alerts from individual datasets. For example, an alert may indicate that changes exist in a dataset that have not been merged in the current dataset. As another example, an alert may indicate that a merge request from the current dataset has been approved or rejected by the target dataset. In some embodiments, the graph 532 may also allow a user to submit a merge request to the different datasets in the hierarchy. In this example, these functionalities are implemented via a collaboration menu 534, as shown, which allows the user to view alerts and/or new change in a selected dataset, or submit a merge request to a selected dataset.

Figure 5C:
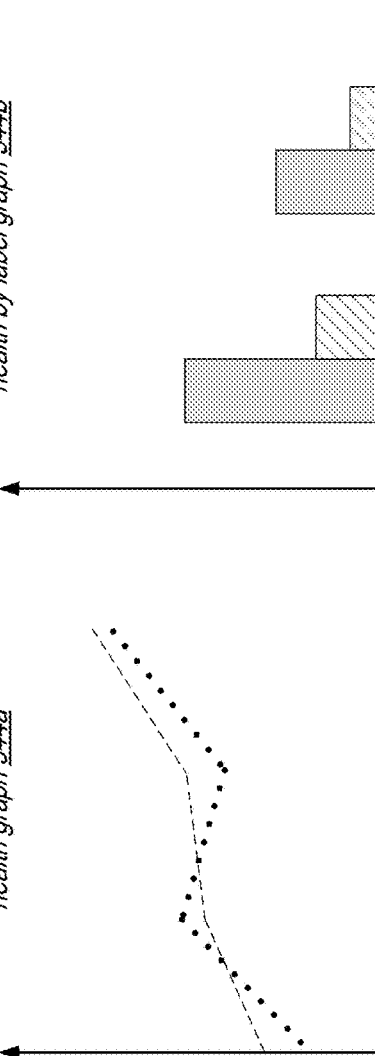

As shown, FIG. 5C shows view 500 with tab 540 selected. In the HEALTH tab 540, various health information about the dataset (here BIRD-CAT-DOG) are shown. Depending on the embodiment, the health of a dataset may include various types of changing conditions of a dataset. For example, in some embodiments, the health of a dataset may be based on one or more quality metrics 542, such as accuracy, recall, etc. In some embodiments, the population size and/or sample distribution of the dataset across various labels may be considered part of the dataset health. In some embodiments, these metrics may be periodically measured or assesses via one or more audits. As shown, in this example, the section 546 allows users to configure and run the auditing of dataset health using manual and/or automated audits. In some embodiments, the audit configuration may allow the user to choose an algorithm or ML model to perform a machine audit of the dataset. As shown, the audit may be configured to run periodically (e.g., once a month). In some embodiments, audits may be configured to trigger based on certain events (e.g., a large merge). In some embodiments, the view may allow the user to view the results of an audit (e.g., votes from human or automated auditors).

As shown, in this example, a number of health graphs 544 are displayed for the dataset. Graph 544a shows the changes in the one or more health metrics over time. Graph 544b shows the one or more health metrics for different labels. In this example, the user may also view the full health report by clicking on the link 543. In some embodiments, the format and information presented on the HEALTH tab may be configurable by the user.

Figure 5D:
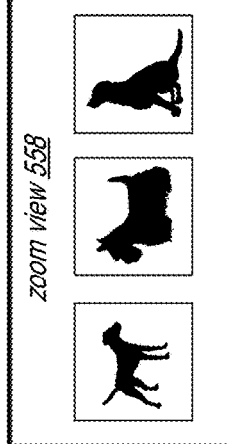

As shown, FIG. 5D shows view 500 with tab 550 selected. In some embodiments, the CHANGES tab 550 may display the incremental changes that have been made to a dataset. For example, incremental changes may be displayed based on a configurable time period (e.g., to display changes in the most recent week). As shown, the tab 550 displays a change summary table 552, which in this example groups the changes to the dataset according to the different class labels in the dataset. In some embodiments, the dimensions of the table 552 may be configurable by the user. In some embodiments, the samples may be grouped by a clustering technique, for example, based on extracted feature vectors of the samples. As shown, in each grouping or cell in the table 552, a summary of changes to the samples in that grouping or cell is displayed (e.g., the numbers of samples that were added, removed, or modified during the change period). In this example, the GUI also provides a zoom view 558, which may be used to display the samples (e.g. image samples) that were changed in the cell. The combination of the table 552 and zoom view 558 thus provides the user an intuitive interface to quickly understand the changes that were made to the dataset, without having to navigate through all label groupings or samples in the dataset.

As shown, in this example, the tab 550 includes a VIEW CLASS/LABEL CHANGES button 554. This button may be configured to generate another view or GUI that displays any changes to the classes or labels in the dataset (e.g. the addition or removal of current labels). In some embodiments, other user control elements may be included to show any configuration or metadata changes to the dataset. As shown, another button 556 may be used to see changes in label or class distributions in the dataset. For example, in some embodiments, the such changes may be displayed using one or more pie charts or bar charts (e.g., showing before and after distributions of the dataset).

Figure 5E:
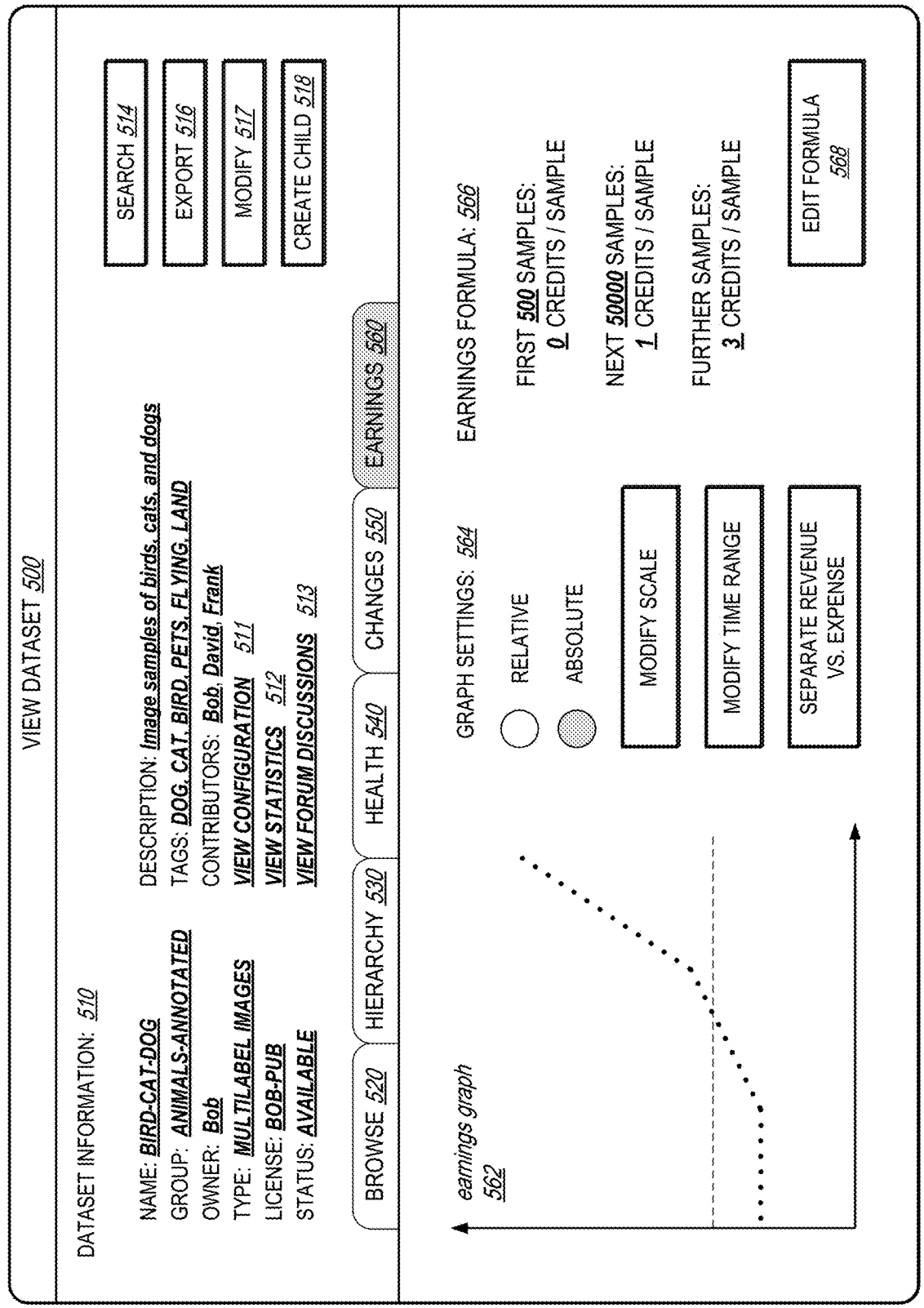

As shown, FIG. 5E shows view 500 with tab 560 selected. In some embodiments, the EARNINGS tab 560 may display various types of earnings data associated with the dataset. In some embodiments, this tab may be visible only to the owner or contributors of the dataset. As shown, the tab 560 displays an earnings graph 562, which displays the earnings of the dataset generated from usage by other users on CDMS. In this example, the horizontal dashed line indicates a zero level. Thus, the net earnings of the dataset is initially negative. This may be due to an initial cost of creating the dataset from another dataset. As shown, the earnings of the dataset eventually becomes positive, as other users on CDMS begins to use the dataset.

As shown, the display settings of the graph 562 in this example may be configured via various controls under the GRAPH SETTINGS section 564. Additionally, in this example, the tab 560 displays an earnings formula, which specifies how the earnings may change for using the dataset based on a level of usage. For example, the dataset may allow some small number of samples to be used for free, and then being to charge more credits per sample for larger usage levels. Button 568 may be used to modify the earnings formula.

Figure 6:
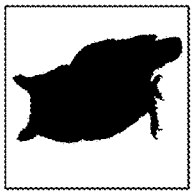
FIG. 6 depicts an example GUI for submitting a merge request to a dataset in CDMS, according to some embodiments.

FIG. 6 depicts an example GUI for submitting a merge request to a dataset in CDMS, according to some embodiments. In some embodiments, the SUBMIT MERGE REQUEST view 600 may be implemented as part of the dataset collaboration interfaces 146, as discussed in connection with FIG. 1.

In some embodiments, view 600 may allow the user to submit a merge request to a target dataset (here BIRD-CAT-DOG). In some cases, the merge request may be submitted by an authorized contributor of the target dataset. In some embodiments, the merge request may be submitted to a dataset that the submitting user cannot modify. For example, in some embodiments, view 600 may be displayed in response to, for example, an interaction with the collaboration menu 534, as discussed in connection with FIG. 5B. In some embodiments, the submission may need to be reviewed by an authorized contributor of the target dataset before the change is accepted.

As shown, the view 600 in this example includes a navigation tree 610, which allows the user to navigate select data samples in the target dataset. In some embodiments, the view 600 may also include user controls to navigate the samples to be submitted (here shown in section 630). As shown, section 620 displays the samples that are in the selected category in the target dataset (samples with label of FLYING). The view 600 may provide one or more editing controls to specify modifications to particular samples in the target dataset, for example, to delete or change the labeling of the particular samples. In this example, the samples that are shown in gray are samples that have been modified (e.g. modified sample 622).

As shown, section 630 displays a set of new data samples to be added to the target dataset. In some embodiments, these samples may be selected from a contributing child or parent dataset to the target dataset. In some embodiments, the samples may be collected from another source, for example a data source external to CDMS. In some embodiments, the view 600 may allow the submitting user to provide comments regarding the merge request for the reviewer. The merge request is then submitted via the SUBMIT button 640.

FIGS. 7A to 7E depict example GUIs that implement a merge request review process in CDMS, according to some embodiments. In some embodiments, these GUIs may be implemented as part of the change review interfaces 150, as discussed in connection with FIG. 1.

As discussed, in some embodiments, a merge request may need to be reviewed and approved before the requested merged is applied to a target dataset. In some embodiments, authorized approvers (e.g. the dataset owner or a contributor) may be notified of a pending merge requests via an alert. For example, such alerts may be seen via the hierarchy graph 532 of FIG. 5B or the ALERTS button 318 of the DASHBOARD view 300. In some embodiments, CDMS may implement the review process in a sequence of review GUIs to allow the reviewer to examiner different aspects of the merge request. In some embodiments, details of the review process (e.g., the ordering of the review GUIs) may be configurable differently for individual datasets.

Figure 7A:
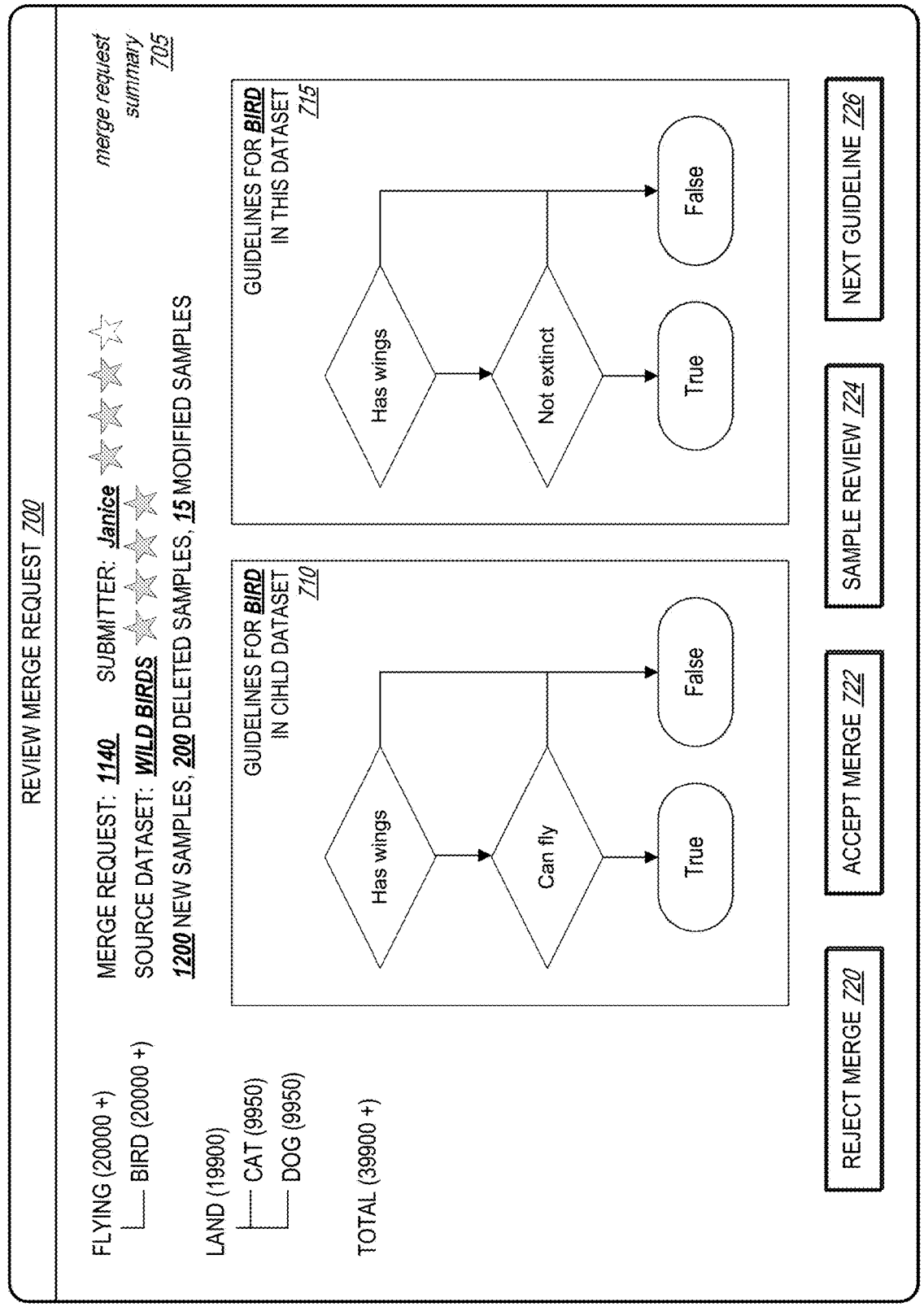

In FIG. 7A, the view 700 displays the respective labeling guidelines of the source dataset and target dataset (BIRD-CAT-DOG), to present a comparison of the two. In some embodiments, this GUI may be implemented the guideline compare interface 152 of FIG. 1. As shown, in this example, the GUI also includes a merge request summary section 705, which indicates certain basic information about the pending merge request. In this example, the summary information includes the merge request ID (1140), the user that submitted the request (Janice) with her user rating in CDMS, the source dataset where the merge request originated from (WILD BIRDS), and a list of counts of the different types of changes included in the request.

The GUI in this example displays the labeling guidelines 710 and 715 for label BIRD in the source dataset (WILD BIRDS) and labeling guidelines for label BIRD in the target dataset (BIRD-CAT-DOG). In some embodiments, these guidelines may be specified as part of the metadata of the dataset, which may be used to guide human users to perform manual labeling of the samples. In this way, multiple human annotations will have a common understanding of what qualifies as a BIRD sample when performing the labeling. In some embodiments, the guidelines may also form the basis for constructing automated labeling tools. During the review process, these guidelines may be show to provide the reviewer an idea of the semantic differences of the label BIRD across the two datasets. For example, in some cases, where the semantic meaning of the label differs drastically, the merge request may simply be rejected at this stage, for example, using button 720. Conversely, in some embodiments, where the label semantics of the two datasets are nearly identical, the review may simply choose to accept the merge request, using button 722. Alternatively, in some cases where the semantics of the two labels are somewhat similar but not exactly the same (for example as shown), the review may choose to perform additional review of individual samples, using button 724. In some embodiments, a merge request may involve multiple labels with corresponding guidelines (e.g., label guidelines for BIRD, CAT, DOG, etc.), and the GUI may allow the user to review each pair of respective guidelines in turn, and accept, reject, or further review each label individually. Accordingly, the review may proceed to the next guideline using button 726.

Figure 7B:

FIG. 7B displays the view 700 in a next step of the review process, in this example. At this step, certain detected sample conflicts raised by the merge request are displayed and possibly resolved. For example, in some embodiments, a sample conflict may be raised if an identical or highly similar sample already exists in the target dataset for an incoming sample in the merge set specified by the merge request.

In some embodiments, such similarity conflicts may be automatically detected using a model or algorithm associated with the dataset. For example, in this case, a conflict detection model for BIRD images may be employed by the BIRD-CAT-DOG dataset. In some embodiments, the model may perform a quick initial comparison of an incoming sample with existing samples in the target dataset (for example via a tree search of feature vectors or via a clustering technique), and classify the incoming sample according to its conflict probability. In some embodiments, the detection may be performed at least in part by humans, for example, via the crowdsourcing task service 280 of FIG. 2.

In some embodiments, a conflict classification may be made based on a match metric 743 between two samples. The samples with detected conflicts may then be displayed according to its conflict classification. In some embodiments, the manner that samples are classified into conflict categories may be configured by the user, for example using button 734. In some embodiments, this configuration may be performed via a configuration interface as shown in FIG. 4B. In this example, the conflict categories are shown on three separate tabs. Tab 731 shows samples with possible or potential conflicts. Tab 732 shows samples with certain conflicts, which may have a higher match metric value. In addition, tab 733 shows intra-set conflicts between just the incoming samples in the merge set or the existing samples in the target dataset. In some embodiments, tab 733 may be the only tab displayed when a periodic review is performed on the target dataset that is not triggered by a merge request.

As shown, in this example, the possible conflicts tab 731 is selected. In this example, a list of existing samples 741 is shown on the left, and a number of new samples in conflict 742 is shown on the right. In other embodiments, the conflicts may be presented with individual samples from the merge set and a list of conflicting samples from the target dataset. As shown, the GUI includes a number of user control elements (e.g. the buttons on the right) to manually select individual samples for acceptance or rejection. In some embodiments, rejected samples at this stage may be removed from the merge set and not applied as part of the merge request. In some embodiments, an audit button may be provided to allow the review to initiate a manual or automated audit of the conflict. This may be done in some cases, where the conflict is difficult to assess, or where there are too many conflicting samples to review.

In some embodiments, what conflicts that are shown on tab 731 may be controlled via a user control element such as the SELECT section 730. In this example, the section 730 implement a series of selectable filtering criteria that limits that conflicts are shown to the reviewer on tab 731.

As shown, in this example, additional buttons appear at the bottom of the tab 731, which may be used to perform global actions on the entire list of conflicts. For example, button 744 may be used to simply accept all incoming samples in the merge set with possible conflicts shown on tab 731. Button 745 may be used to reject all incoming samples on tab 731. Button 746 may be used to perform a default action on all incoming samples on tab 731, which may be action configurable via the dataset configuration GUIs. For example, in some embodiments, the default action may be to accept all conflicting samples below a certain match threshold and apply a set of labels to those samples, and then send the remaining conflicting samples for audit. Finally, button 747 may be used to initiate auditing for all samples on tab 731. As discussed, the auditing process for sample conflicts may be configured at the dataset level, and may be implemented using human or automated review.

FIG. 7C depicts the view 700 with the auditing results obtained from the auditing buttons. As shown, in this view, where auditing was performed on the first row of image samples, audit results are shown as a set of match metrics alongside the initial match metric 743 obtained for the initial conflict detection. As shown, in this example, both a manual audit and an automated audit was performed. The results of the manual audit are shown in the second set of match bars 751, and the results of the automated audit are shown in the third set of match bars 752. In addition, button 755 may be used to view additional details of the audits, for example, the number of users that participated in the manual audit and the number of positive and negative votes, etc. Additionally, in some embodiments, the audits results displayed may be filtered based on filtering criteria, for example, using the controls shown in section 750. Using the audit results shown on the GUI, the reviewer can make a final decision as to all of the detected sample conflicts.

Figure 7D:
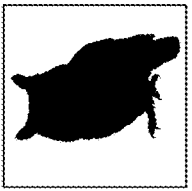

FIG. 7D depicts the view 700 in a next step of the review process, in this example. At this step, the labels for incoming samples in the merge set are reviewed and audited. In some embodiments, this step may also auto-generate labels for samples with no label information (e.g., for a new label in the target dataset or for new samples that are not labeled).

As shown, the GUI in this step display two tabs. Tab 760 shows a listing 765 of possible label errors for the label BIRD. In some embodiments, this list of samples may be initially filtered via an algorithm or model to reduce the review set to a few questionable samples. In some embodiments, only those samples that did not match an existing sample in sample match step are label checked. For those incoming samples that did match an existing sample, they are simply annotated with the label(s) associated with the existing sample. A shown, tab 762 is not selected, and may show a similar listing of samples that are not labeled in the merge set, but have been auto-assigned the BIRD label by an auto-labeling tool used by the target dataset. In either case, the GUI provides control elements to manually accept or reject the labels on the samples presented. As shown, the GUI also provides user controls to initiate auditing of the labels. For example, such auditing may be used where sample label is difficult to validate, or when there are too many samples with possible labeling errors.

As shown, in this example, audit results 766 and 768 are already present for the samples 765. For example, after an auditing is performed, the audit results 766 and 768 may be shown to indicate a score for the label. The higher the score, the more trustworthy the label is. In this example, result 766 may represent the results of a manual audit, and the score may be an indication of votes cast by a group of human users. In this example, result 768 may represent results from an automated auditing system. Result 768 may indicate a confidence score generated by the automated auditing system that the sample in question is correctly labeled as BIRD. As shown, the GUI also allows the reviewer to view the full audit details of the audits. In some embodiments, the GUI may allow the review to sort the samples based on the audit results (e.g. the label scores), in order to focus on those samples that are particularly questionable. Once the reviewer is satisfied with that the labeling of the incoming samples is sufficiently correct, he may use the button 769 to proceed to the next step of the review process.

Figure 7E:
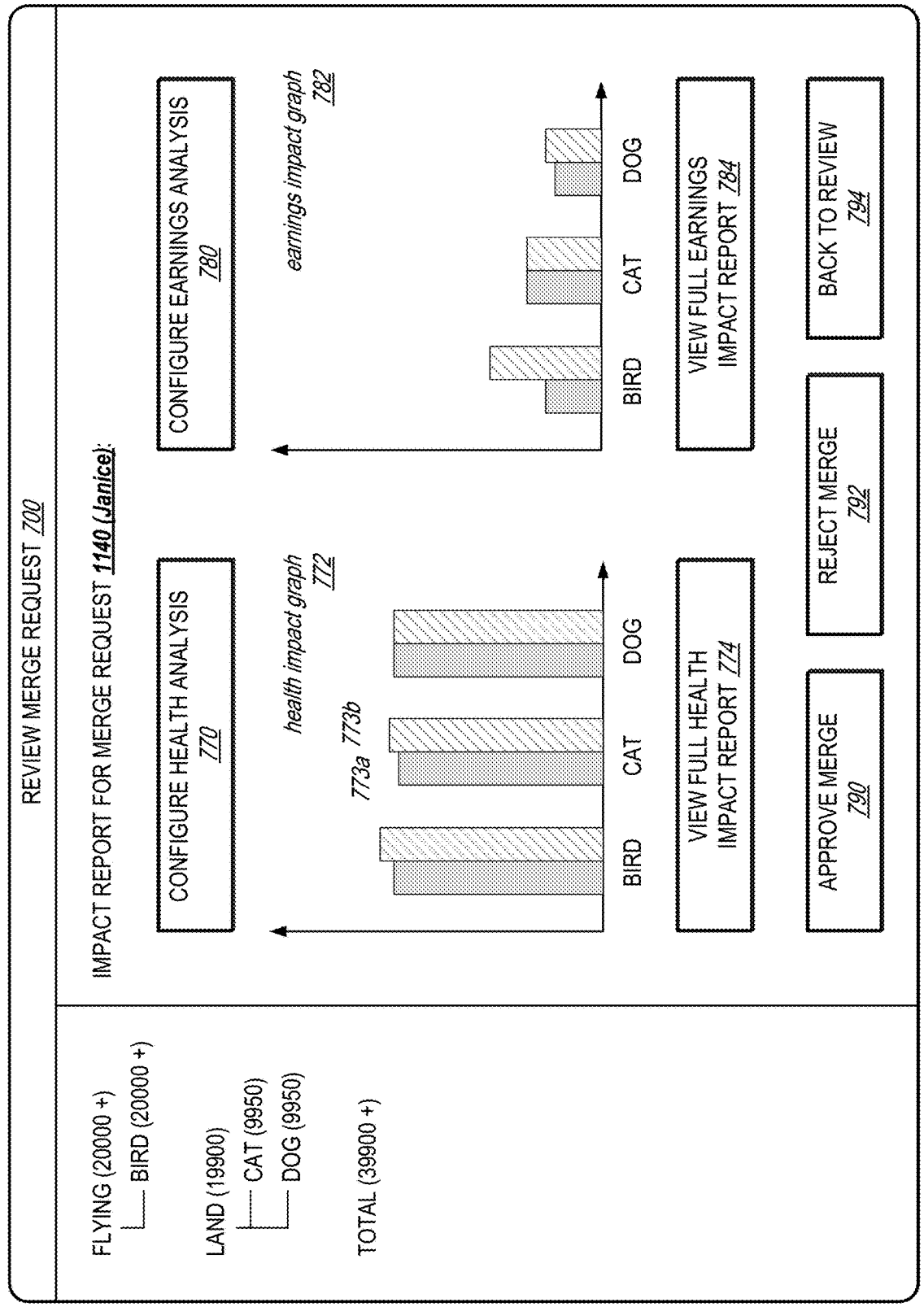

FIG. 7E depicts the view 700 in a next step of the review process, in this example. At this step, an impact report for the merge request is generated and displayed. In some embodiments, this view in the GUI may be implemented as part of the impact analysis interfaces 160 of FIG. 1.

In some embodiments, the impact analysis process of a merge request may be implemented as an offline process, which may take some time to complete. In some embodiments, the analysis may involve observing the dataset with the merged changes under simulated conditions for a period of time. In some embodiments, data such as health metrics and/or earnings may be collected under the simulation conditions, and a forecast may be made based on the collected data. In some embodiments, this impact analysis process may be completely optional, so that the merge request may be applied without waiting for the simulation period to finish.

As discussed, the impact analysis process may be performed in two contexts. First, the impact analysis may be performed to review a pending merge request. Second, the impact analysis may be performed periodically, for example via the dataset sanitizer 170, to periodically assess the ongoing conditions of the dataset. As shown, the tests performed to generate the impact analysis report may be configurable by the user. In this example, buttons 770 and 780 may be used to configure the impact analysis process for dataset health and earnings, respectively.

As shown, the GUI may display one or more selected graphs that summarize results in the impact analysis report. As shown, health impact graph 772 shows the before 773a and after 773b health metrics values for the dataset before and after the merge. For example, the metric used to indicate health may be an accuracy metric, and the displayed values indicate the value of this metric before the merge and after the merge (during the simulation period). As shown, an earning impact graph 782 is also shown in this example, which may display the changes in impact on the dataset, before and after the merge. In the periodic sanity review context, the selected graphs may be used to compare the relevant health and earnings metrics for a current observation period with a previous observation period. As shown, buttons 774 and 784 may allow the user to view the full details of the impact analysis report.

As shown, the GUI in this example is invoked as a part of a merge request review, and buttons 790 and 792 are provided on the GUI to approve or reject the merge request, based on the impact analysis report. Additionally, button 794 is provided to go back to a previous step in the review process, for example, to re-examine the merge request in light of the impact analysis report.

Figure 8:
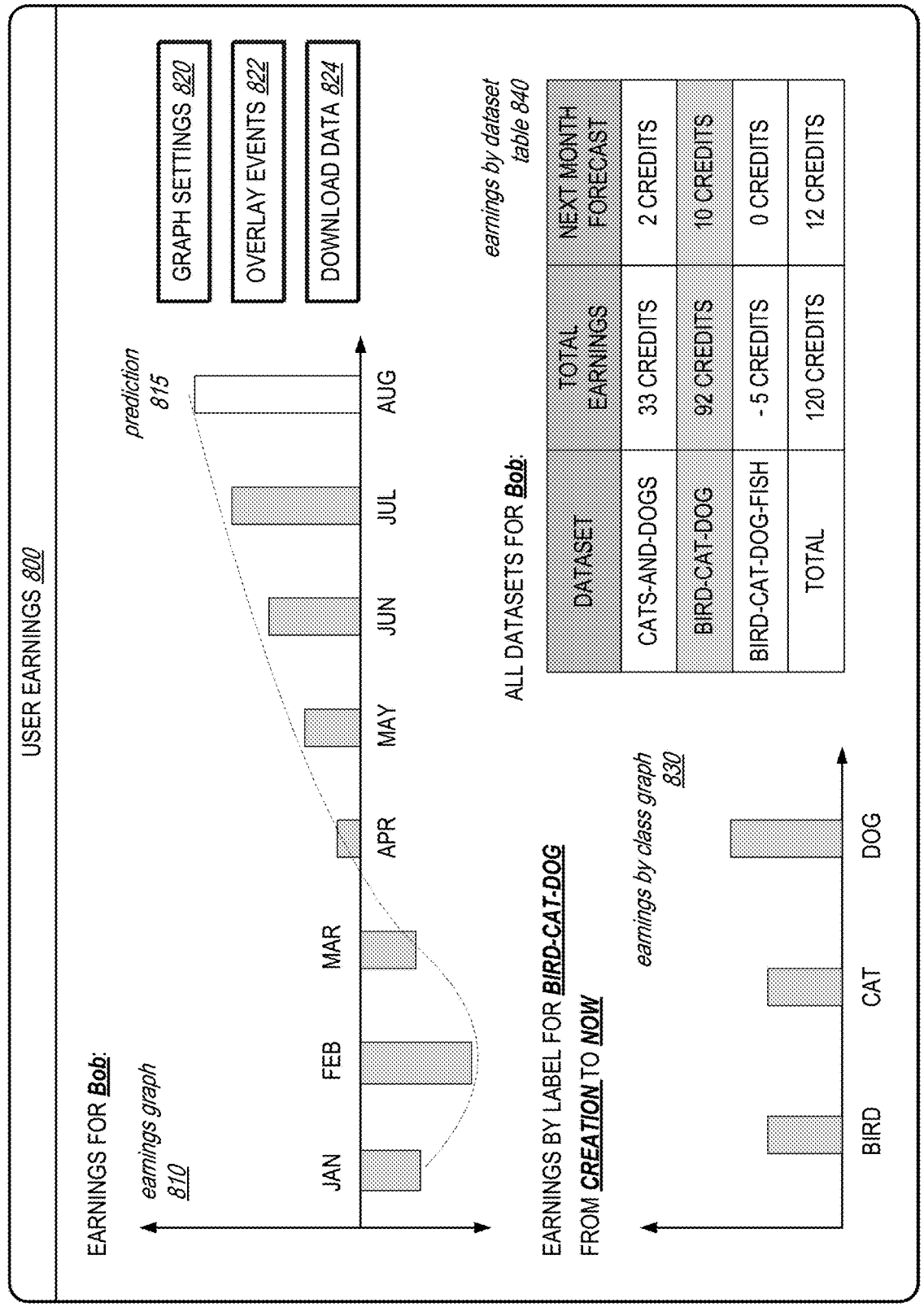
FIG. 8 depicts an example GUI that implement a user earnings view for a user in CDMS, according to some embodiments.

FIG. 8 depicts an example GUI that implement a user earnings view for a user in CDMS, according to some embodiments. In some embodiments, CDMS may aggregate earnings to individual users, instead of in addition to individual datasets. Thus, for example, an individual user on CDMS may have, as part of his or her user account, a wallet indicating his or her earnings, which may be received for his ownership, contribution, or association with one or more CDMS datasets. In some embodiments, such earnings may be accounted for in terms of credits, which may be used to pay for other CDMS services. In some embodiments, GUI 800 may be invoked via the WALLET button 346, as discussed in connection with FIG. 3.

As shown, the USER EARNINGS interface 800 displays the earnings for the user Bob. In this example, view 800 displays an earnings graph 810, which displays the aggregate earnings of Bob over individual months. In some embodiments, the CDMS may make a prediction 815 of the earnings, based on an observed trend for the earnings in previous time periods. In this example, the graph 810 includes a number of buttons to configure how the graph is displayed. For example, button 820 may be used to change the graph's display settings, such as for example the scale or time range of the graph. Button 822 may be used to overlay certain events on the graph, for example, the creation or termination of a dataset, or a particular payment for data. Button 824 may be used to download the earnings data, which may be used to import the data to other systems (e.g. a spreadsheet) for other uses.

As shown, in the bottom right side of the GUI 800, an earnings by dataset table 840 is provided. In this table, the total earnings are shown for each dataset that Bob receives earnings from. Additionally, an earnings forecast is made for each individual dataset listed. In some embodiments, as discussed, these forecasts may be made by machine algorithms or even ML applications provided to or hosted by the CDMS. As shown, at the bottom left side of the GUI 800, and earnings by label graph 830 is shown, for a particular dataset selected in the table 840. In this example, the graph 830 is configured to show earnings under individual labels BIRD, CAT, and DOG. In some embodiments, CDMS may track earnings on a sample-by-sample basis, and not just on a dataset-by-dataset basis. Thus, the graph 830 may be generated to show a breakdown of earnings by sample labels. Such graphs allow the data owner to understand which portion the dataset are in particular high demand in the CDMS user community.

FIG. 9 depicts an example GUI that implements a discussion forum view for users in CDMS, according to some embodiments. In some embodiments, the discussion forums may allow system users to exchange ideas about the managed datasets, promote their datasets to other users, or ask questions about datasets. In some embodiments, GUI 900 may be invoked via the DISCUSS button 348, as discussed in connection with FIG. 3.

As shown, the view 900 includes a threads view 910. In some embodiments, the forum may include multiple subforums for individual topics. In some embodiments, each individual dataset on the system (e.g. the BIRD-CAT-DOG dataset) may have its own subforum. The subforum may be moderated by one or more users to focus on subjects related to that dataset. In this example, a number of threads are shown in a list, which may be clicked on to all postings in that thread. As shown, each thread may have a thread rating 912, which may be an average of user ratings for that thread. In this example, individual threads may also be associated with one or more tags 914, which may be used to filter or search particular threads. Section 910 also displays other helpful metadata about the threads, including the original post author and date, the last post author and date, and the number of replies and views in the thread.

In some embodiments, the discussion forum view 900 may also provide a posting search mechanism. As shown, in section 920, search results are provided for a posting search, based on keywords or tags BIRD and IMAGE. The search result includes two postings. The first posting asks about a dataset for birds. The second posting responds to the first posting by providing a link to a WILD BIRDS dataset. In this example, the link may take the user to a GUI or view about the dataset, such as view or GUI 500. As shown, certain postings may have additional metadata, such as an answer rating 922 showing other user's ratings of the answer, an indicator 926 showing that this particular answer is the accepted answer according to the original posting. Moreover, as shown, some users may be displayed with a user rating 924, which shows other CDMS users' rating of that user. Users with higher user ratings may represent more trusted users in the CDMS community.

Figure 10:
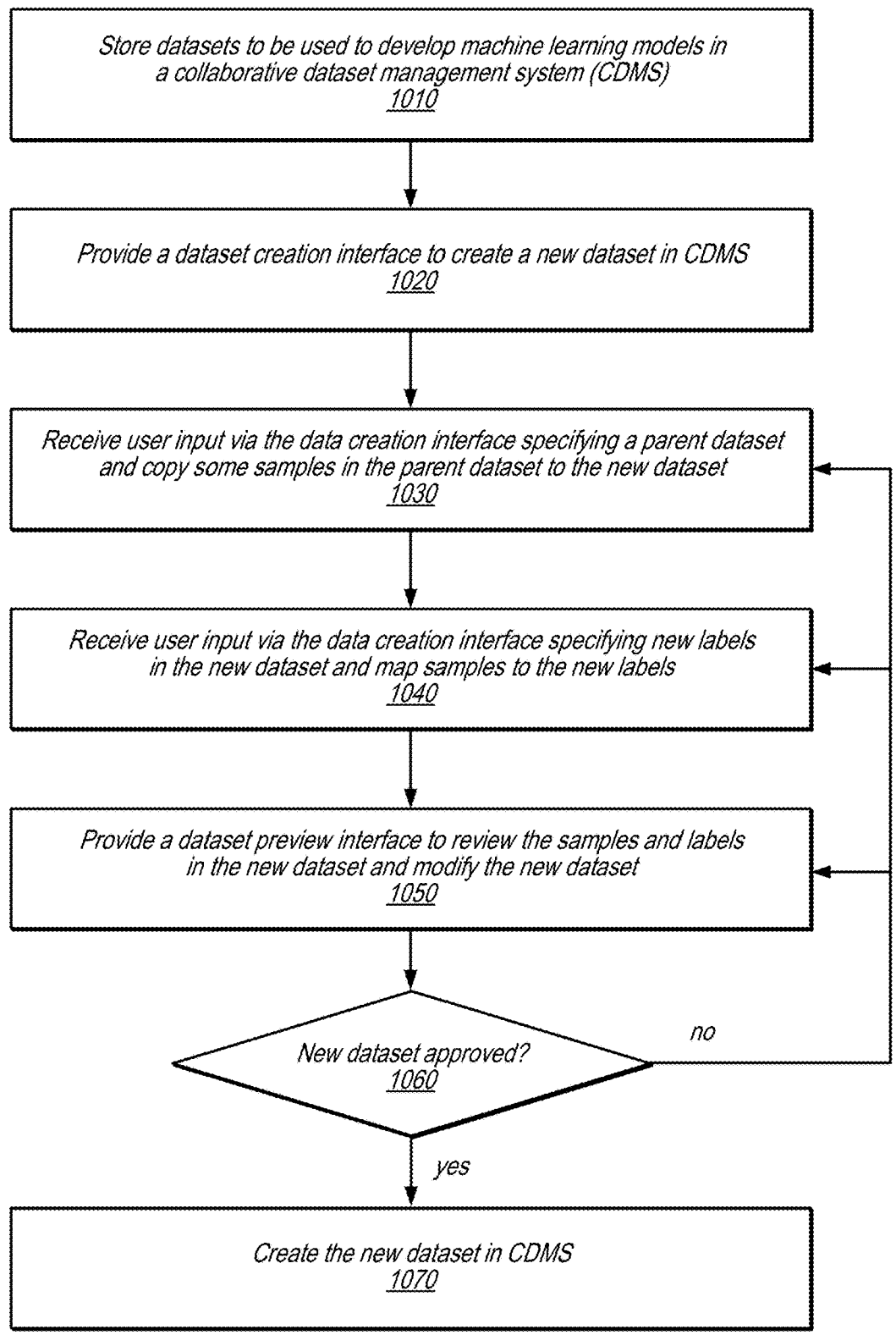
FIG. 10 is a flow diagram illustrating a process of creating a dataset in CDMS, according to some embodiments.

FIG. 10 is a flow diagram illustrating a process of creating a dataset in CDMS, according to some embodiments. The process depicted in the figure may be performed using one or more user interfaces of the CDMS, such as for example the create dataset view 400 of FIGS. 4A to 4D.

At operation 1010, datasets are stored in a collaborative dataset management system. The datasets may be ML data to be used to develop machine learning models. In some embodiments, the datasets may include data samples that are labeled with truth labels. As discussed in connection with FIG. 1, in some embodiments, CDMS may be implemented as a data management system to allow users to manage the creation and evolution of ML datasets. The datasets themselves may be stored in a data repository, for example the CDMS repository 132 of FIG. 1. In some embodiments, the datasets may be stored in versions, so that the entire history of a dataset is maintained by CDMS. In some embodiments, the CDMS may provide these stored datasets to a ML development system for building ML applications, such as the machine learning service 184.

At operation 1020, a dataset creation interface is provided to create a new dataset in CDMS. In some embodiments, the dataset creation interface may include one or more GUIs, which may be for example user interface 400 as discussed in connection in FIGS. 4A to 4D. In some embodiments, the dataset creation interface may implement a creation workflow, which takes the user through a series of configuration interfaces to specify different information about the new dataset.

At operation 1030, user input is received via the dataset creation interface specifying a parent dataset, and accordingly, some samples are copied from the parent dataset to the new dataset. In some embodiments, the CDMS may allow one dataset to inherit data samples, labels, or dataset configuration from an existing parent dataset in CDMS. The inheritance may be specified for example using a user interface as shown in FIG. 4A. In this manner, a CDMS user may be able to quickly create a dataset from the datasets of other users. In some embodiments, the user that creates a new dataset in this fashion may be automatically charged a fee from the owner of the parent dataset, which is determined according to a pricing policy of the parent dataset.

At operation 1040, user input is received via the dataset creation interface specifying new labels to create in the new dataset. Accordingly, the samples in the dataset are mapped to the new labels. In some embodiments, the mapping may be performed in a manual fashion, where the user assigns samples to the new labels according to the samples existing labels, for example, as seen in FIG. 4C. In some embodiments, the mapping may be performed programmatically, for example, by auto-labeling the samples based on a ML application or an automated algorithm. In some embodiments, the mapping may be performed in part by a human and in part by the machine. For example, in some embodiments, the labeling may be performed by an active learning annotator that can observe a human's labeling behavior and then learn to mimic that labeling behavior. In some embodiments, the CDMS may cluster the incoming samples according to their feature vectors, and allow the user to assign distinct clusters to the new labels.

At operation 1050, a dataset preview interface is provided to review the samples in the new dataset and their labels, and allow the user to make any modifications if necessary. In some embodiments, such a preview interface may be implemented in similar fashion as the interface shown in FIG. 4D. In some embodiments, as discuss, the user may be able to add or remove samples or modify the samples labeling via the preview interface.

At operation 1060, a determination is made whether the new dataset is approved. In some embodiments, one of the dataset creation interfaces or the dataset preview interface may include user control elements to approve the new dataset. If the dataset is approved, the process proceeds to operation 1070, where the new dataset is created in CDMS, for example by storing the samples in the CDMS repository. In some embodiments, the CDMS may also generate other metadata for the new dataset, such as certain metadata, metrics, and versioning information. If the new dataset is not approved, the user may return to one or more previous interfaces in the dataset creation process, where additional adjustments can be made. In some embodiments, the CDMS may allow a user to save a new dataset in an in-progress state, so that the user can later return to the new dataset to continue working on the new dataset.

Figure 11:
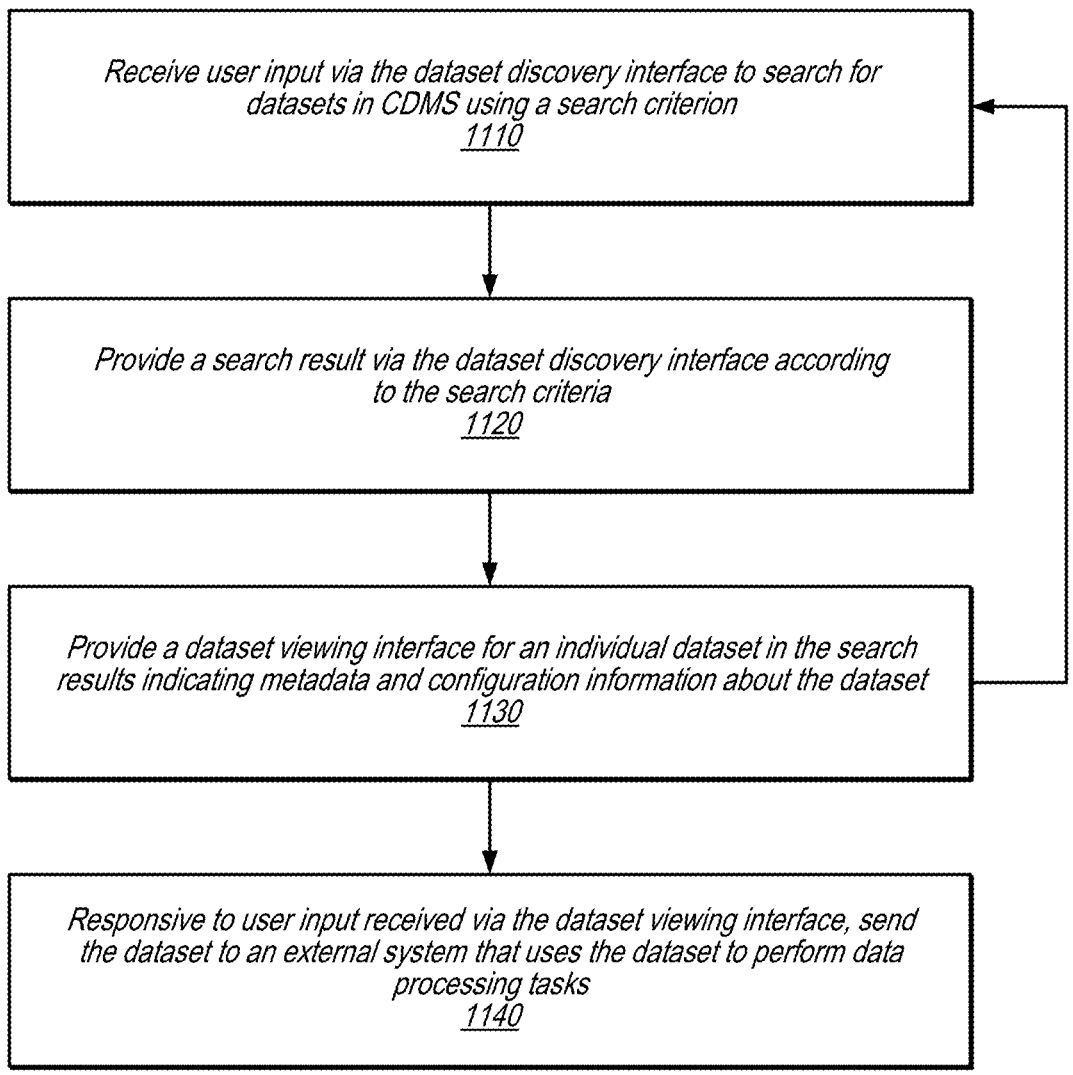
FIG. 11 is a flow diagram illustrating a process of searching for a dataset in CDMS, according to some embodiments.

FIG. 11 is a flow diagram illustrating a process of searching for a dataset in CDMS, according to some embodiments. The process depicted in the figure may be performed using one or more user interfaces of the CDMS, such as for example the dashboard view 300 of FIG. 3 and view dataset view 500 of FIGS. 5A to 5E.

At operation 1110, user input is received via a dataset discovery interface to search for datasets in CDMS using a search criterion. In some embodiments, the search may be initiated using a discovery interface such as discovery interface 144 of FIG. 1. In some embodiments, the search may be initiated via a user control such as button 316 in FIG. 3. In some embodiments, the search criterion may be based on a keyword, which may be used to match various metadata fields on datasets in CDMS, such as a dataset's name, description, or any associated tags. In some embodiments, the search may also specify one or more properties of the dataset, such as the dataset's rating, creation date, size, contributor list, costs, etc.

At operation 1120, a search result is provided via the dataset discovery interface according to the search criteria. In some embodiments, the search result may be provided in a list form, listing datasets in CDMS that match the search. In some embodiments, the listing may be shown in similar fashion as the dataset tables in FIG. 3. In some embodiments, the dataset listings may show various properties for each dataset, and allow the user to further filter or sort the listed datasets. In some embodiments, the discovery interface may allow the user to click on or select an individual dataset in order to view additional information about the dataset.

At operation 1130, a dataset viewing interface is provided for an individual dataset in the search results. The dataset viewing interface may indicate metadata and configuration information about the dataset. In some embodiments, the dataset viewing interfaces may include GUIs such as those shown in FIGS. 5A to 5E. In some embodiments, the dataset viewing interfaces may allow the user to browse and view individual data samples in the selected dataset. In some embodiments, the dataset viewing interfaces may allow the user to modify the configuration of the dataset or individual data samples in the dataset.

At operation 1140, responsive to user input received via the dataset viewing interface selecting the dataset, the CDMS may send the dataset to an external system that uses the dataset to perform data processing tasks. In some embodiments, the external system may be a machine learning application development system, which may use the dataset to perform ML tasks, such as to train or evaluate a ML model under development. In some embodiments, the CDMS may include an external system interface that is configured to interact or communicate with external systems. For example, in some embodiments, the CDMS may invoke functions in the external system via an API of the external system, in order to send that dataset to the external system. In some embodiments, the CDMS may allow the external system to invoke functionality within the CDMS, for example, to access datasets stored in the CDMS repository. In some embodiments, the selection of the dataset may be performed via an access interface of the CDMS, which allows a user to export the dataset, send the dataset to another system, or grant access to the dataset. In some embodiments, the access interface may include the discovery interface of the CDMS. As shown, operations 1110, 1120, and 1130 may repeat based on user input. Thus, a user may perform repeated searches to find new datasets, examine detailed information about the datasets found, until an appropriate dataset is found to send to the external system.

Figure 12:
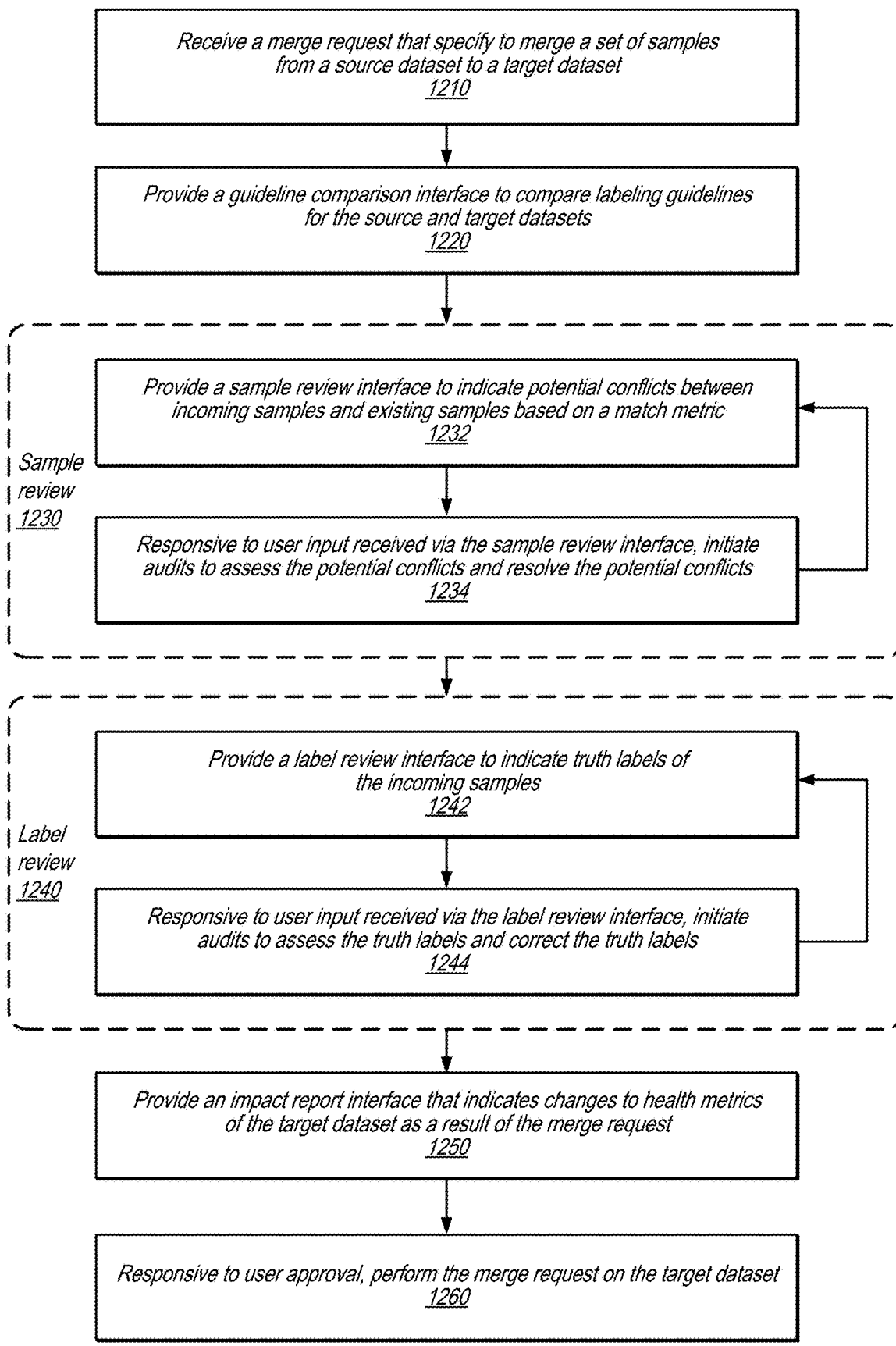
FIG. 12 is a flow diagram illustrating a process of reviewing a merge or modification request to a dataset in CDMS, according to some embodiments.

FIG. 12 is a flow diagram illustrating a process of reviewing a merge or modification request to a dataset in CDMS, according to some embodiments. The process depicted in the figure may be performed by GUIs such as those shown in FIGS. 7A to 7E, or the change review interfaces 150, as discussed in connection with FIG. 1.

At operation 1210, a merge request is received that specify to merge a set of samples from a source dataset to a target dataset. In some embodiments, the merge request may be specified by a user on CDMS, for example, as discussed in connection with the submit interface 600 of FIG. 6. In some embodiments, the source and target datasets may be related as parent and child datasets. In some embodiments, the merge request may specify data samples to add to or remove from the target dataset. In some embodiments, the request may specify changes, such as label changes, to individual samples. In some embodiments, the request may specify to add or remove class labels to the target dataset. In some embodiments, the request may specify changes to the metadata or configuration of the target dataset. In some embodiments, the merge request may not original from any source dataset, but rather, simply a modification request to change some aspect of the target dataset.

At operation 1220, a guideline comparison interface is provided to compare labeling guidelines for the source and target dataset. In some embodiments, the guideline comparison interface may be the implemented as shown in FIG. 7A. In some embodiments, the guideline comparison interface may show the semantic meaning for certain labels employed in the source and target datasets. Based on this comparison, a review may decide whether the labels in the source and target datasets are sufficiently similar in meaning to proceed with the review process. If not, in some embodiments, the review may simply reject the merge request at this stage.

Operations 1232 and 1234 may comprise a sample review process, which may be implemented using for example the GUI shown in FIGS. 7B and 7C. At operation 1232, a sample review interface is provided to indicate potential conflicts between incoming samples specified in the merge request and existing samples in the target dataset. In some embodiments, the conflict may be determined based on similarity or match metric, so that highly similar samples are considered to be in conflict. In some embodiments, the similarity metric may be generated by a tool associated with the dataset, which may be a ML application hosted in an external machine learning service. In some embodiments, samples with potential conflicts are shown side-by-side, so that a review can make a fast determination whether the two samples are truly in conflict.

At operation 1234, responsive to user input received via the sample review interface, audits are initiated to assess the potential conflicts. The audits results are used to update the sample review interface, which allows the reviewer to resolve the conflicts by, for example removing some samples from the merge request. In some embodiments, the audits may be performed by submitting audit jobs to external systems. Some audit jobs may be performed by a crowd-sourcing task performance system. Some audit jobs may be performed by an automated system, such as a ML application. As shown, the process may repeat until all the sample conflicts are resolved to the satisfaction of the reviewer. At that point, the process may proceed to a next reviewing stage.

Operations 1242 and 1244 comprise a label review process, which may be implemented using for example the GUI shown in FIG. 7D. At operation 1242, a label review interface is provided to indicate truth labels of at least some of the incoming samples. In some embodiments, the labels of the incoming samples may be checked via an automated or manual label auditing system, to make an initial determination of whether the labels are questionable. In some embodiments, incoming samples that have close sample matches as determined in process 1240 may simply be checked to verify that they have the same labels. Accordingly, only a subset of the incoming samples in the merge request may be flagged for label review and auditing. In some embodiments, the label review interface may group samples with the same label together, so that the reviewer can quickly detect wrongly labeled samples.

At operation 1244, responsive to user input received via the label review interface, audits are initiated to assess the truth labels of the samples and correct the truth labels. The label auditing in this operation may be performed in similar fashion as discussed in connection with operation 1230. In some embodiments, with the audit results, the review may use controls on the label review interface to modify the labels of the flagged samples. As shown, the process may repeat until all the labeling errors are resolved to the satisfaction of the reviewer. At that point, the process may proceed to the next reviewing stage.

At operation 1250, an impact report interface is provided to indicate changes to health metrics of the target dataset as a result of the merge request. In some embodiments, the impact report interfaces may be implemented as shown in FIG. 7E. In some embodiments, the impact analysis report may indicate the before and after values of certain quality metrics, which are defined to indicate the health of the dataset. For example, the accuracy of the labeling in the dataset may be used to measure the dataset's health. In some embodiments, the impact analysis report may be measured offline, in a simulation period using artificial or actual metrics. These measurements are then collected and compiled to produce the impact report. In some embodiments, the impact report may also provide forecasted values of the health metrics, based on past measurements taken during the simulation period. In some embodiments, in addition to health metrics, the impact report may also include other metrics such as the dataset's earning level, etc.

At operation 1260, responsive to user approval, the merge request or the requested modification is performed on the target dataset. As discussed, in some embodiments, the modification or merge may be saved to the CDMS repository, and a new version for the dataset may be generated in the repository. In some embodiments, the user approval to perform merge may come from any step during the review process. For example, in some embodiments, one or more of the review interfaces may be skipped.

Figure 13:
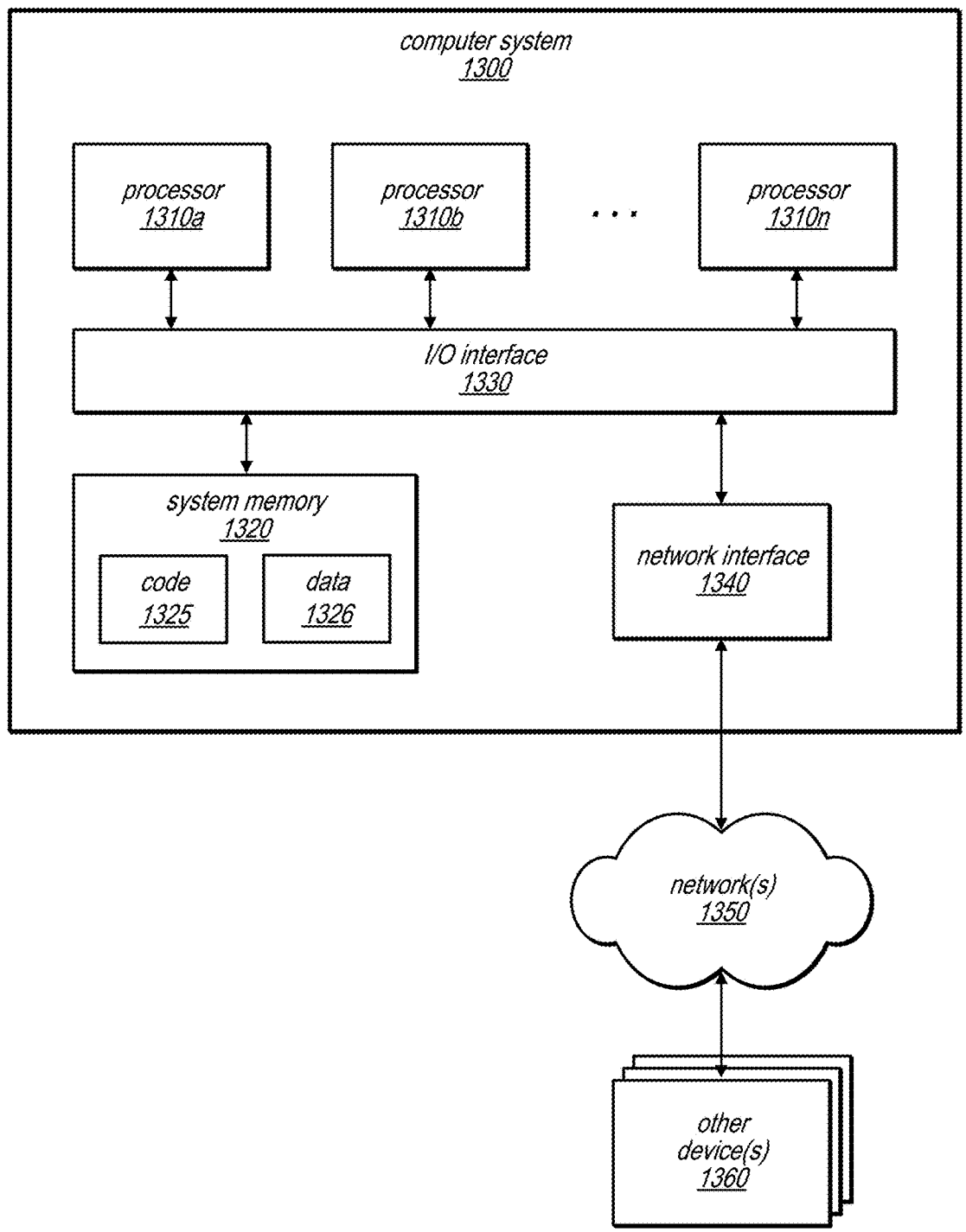
FIG. 13 is a block diagram illustrating an example computer system that can be used to implement a CDMS to store and manage datasets for developing machine learning (ML) systems, according to some embodiments.

FIG. 13 is a block diagram illustrating an example computer system that can be used to implement a CDMS to store and manage datasets for developing machine learning (ML) systems, according to some embodiments. Computer system 1300 may include or be configured to access one or more nonvolatile computer-accessible media. In the illustrated embodiment, computer system 1300 includes one or more processors 1310 coupled to a system memory 1320 via an input/output (I/O) interface 1330. Computer system 1300 further includes a network interface 1340 coupled to I/O interface 1330.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326. The system memory 1320 may include different levels of cache, some of which may be located on the CPU and some away from the CPU. One level of the cache hierarchy may be a last level cache that is shared by all of the processors 1310a to 1310n. The last level cache may be an inclusive cache of the low levels of cache in the cache hierarchy.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices, such as routers and other computing devices, as illustrated in FIGS. 1 through 13, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIGS. 1 through 13 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a data repository configured to store a plurality of datasets of a plurality of users for machine learning (ML) application development, wherein datasets of users are made available to other users subject to conditions, and wherein individual ones of the datasets are stored in one or more versions indicating a modification history of the individual dataset;
   one or more computers configured with computer-executable code to implement a collaborative dataset management service (CDMS) for the plurality of datasets, comprising:
      a discovery interface configured using interface elements to search for one or more of the plurality of datasets of the other users, wherein in response to user input associated with a first user, the discovery interface is configured to execute a search against the data repository for a target dataset, the target dataset of a second user;
      a creation interface configured using interface elements to create, based at least in part on the target dataset of the second user and in accordance with the conditions for the target dataset, a child dataset of the first user in the data repository, wherein in response to user input, the creation interface causes the child dataset to be stored in the data repository, and wherein the child dataset of the first user inherits at least some samples or truth labels of the target dataset of the second user;
      a collaboration interface for the first user to modify the child dataset that is based on the target dataset of the second user, the collaboration interface configured using interface elements to modify the child dataset, wherein in response to user input associated with the first user, the collaboration interface causes the child dataset to be modified in the data repository, and the CDMS is configured to manage versioning of the child dataset when modifying the child dataset;
      an access interface configured using interface elements to provide the modified dataset to a ML application development system in response to user input, wherein the ML application development system is configured to perform one or more machine learning tasks using the modified child dataset; and
      an external system interface configured to, responsive to user input via the access interface,
         send the modified child dataset from the data repository over a network to one or more external ML application development systems, wherein the one or more external systems are external to the collaborative dataset management service and are configured to perform one or more data processing tasks using the modified child dataset.

2. The system of claim 1, wherein the CDMS is configured to:
- receive a modification request to another target dataset;
- detect one or more potential conflicts between one or more existing samples in the other target dataset and one or more incoming samples specified in the modification request, wherein individual potential conflicts are detected based at least in part on a match metric determined for an existing sample and an incoming sample;
- provide, via a review interface of the CDMS, user output that compares the one or more existing samples with respective ones of the incoming samples with potential conflicts;
- responsive to user input received via the review interface, initiate one or more audits to assess the potential conflicts and update the review interface with audit results of the one or more audits; and
- responsive to further user input received via the review interface, remove at least some of the one or more incoming samples with the potential conflicts from the modification request.

3. The system of claim 1, wherein the CDMS is configured to:
- receive a modification request to another target dataset;
- provide, via a review interface of the CDMS, user output indicating one or more samples specified in the modification request and their respective truth labels;
- responsive to user input received via the review interface, initiate one or more label audits to validate the respective truth labels and update the review interface with audit results of the one or more label audits; and
- responsive to further user input received via the review interface, modify at least some of the truth labels of the one or more samples in the modification request.

4. The system of claim 3, wherein to initiate the one or more audits, the CDMS is configured to:
- submit an audit job to an automated auditing system; and
- submit another audit job to a crowdsourcing system configured to perform the other audit job via a plurality of users of the crowdsourcing system.

5. The system of claim 3, wherein:
- the CDMS is hosted on a service provider network,
- the ML application development system is implemented in a machine learning service hosted on the service provider network, and
- to initiate the one or more audits, the CDMS is configured to send one or more audit jobs to the machine learning service.

6. A method, comprising:
- performing, via one or more computers that implement a collaborative dataset management system (CDMS):
  - storing in a data repository a plurality of datasets of a plurality of users, wherein datasets of users are made available to other users subject to conditions, and wherein individual ones of the datasets are stored in one or more versions indicating a modification history of the individual datasets;
  - performing a search for a target dataset of the plurality of datasets in the data repository according to user input associated with a first user and received via a discovery interface of the CDMS, wherein the target dataset is associated with a second user;
  - creating a child dataset for the first user, based at least in part on the target dataset associated with the second user and in accordance with the conditions for the target dataset, in the data repository according to user input received via a creation interface of the CDMS, wherein the child dataset of the first user inherits at least some samples or truth labels of the target dataset associated with the second user;
  - modifying the child dataset in the data repository based at least in part on user input associated with the first user and received via a collaboration interface of CDMS, wherein the CDMS manages versioning of the child dataset when modifying the child dataset; and
  - providing the modified child dataset in the data repository over a network to an external system based at least in part on user input received via an access interface of the CDMS, wherein the external system is external to the collaborative dataset management system and is configured to perform one or more data processing tasks using the modified child dataset.

7. The method of claim 6, further comprising:
- performing, via the one or more computers:
  - receiving a modification request to another target dataset;
  - detecting one or more potential conflicts between one or more existing samples in the other target dataset and one or more incoming samples specified in a modification request, wherein individual potential conflicts are detected based at least in part on a match metric determined for an existing sample and an incoming sample;
  - providing, via a review interface of the CDMS, user output comparing the one or more existing samples with respective ones of the incoming samples with potential conflicts;
  - responsive to user input received via the review interface, initiating one or more audits to assess the potential conflicts and update the review interface with audit results of the one or more audits; and
  - responsive to further user input received via the review interface, removing at least some of the one or more incoming samples with the potential conflicts from the modification request.

8. The method of claim 7, further comprising:
- performing, via the one or more computers:
  - detecting another potential conflict between two or more incoming samples specified in a modification request, wherein the other potential conflict is detected based at least in part on a match metric determined for the two or more incoming samples; and
  - responsive to additional user input received via the review interface, removing one of the two or more incoming samples from the modification request.

9. The method of claim 6, further comprising:
- performing, via the one or more computers:
  - receiving a modification request to another target dataset;
  - providing, via a review interface of the CDMS, user output indicating one or more samples specified in the modification request and their respective truth labels;
  - responsive to user input received via the review interface, initiating one or more label audits to validate the respective truth labels and update the review interface with audit results of the one or more label audits; and responsive to further user input received via the review interface, modifying at least some of the truth labels of the one or more samples in the modification request.

10. The method of claim 9, further comprising:
performing, via the one or more computers:
generating a new truth label for a particular incoming sample specified in the modification request; and
providing, via the review interface, user output indicating the particular incoming sample and its new truth label.

11. The method of claim 9, wherein initiating the one or more audits comprises:
submitting an audit job to a crowdsourcing system configured to perform the audit job via a plurality of users of the crowdsource system.

12. The method of claim 9, wherein:
the CDMS is hosted on a service provider network,
the external system is a machine learning (ML) application development system implemented in a machine learning service hosted on the service provider network, and
initiating the one or more audits comprises sending one or more audit jobs to the machine learning service.

13. The method of claim 9, further comprising performing, via the one or more computers:
providing, via a second review interface of the CDMS, user output indicating an impact report of the modification request, wherein the impact report indicates one or more forecasted changes to one or more health metrics of the other target dataset as a result of the modification request; and
responsive to user input received via the second review interface approving the modification request, performing the modification request on the other target dataset.

14. The method of claim 9, further comprising performing, via the one or more computers:
creating another child dataset of the other target dataset via the creation interface, wherein the other child dataset inherits at least some samples or truth labels of the other target dataset; and
generating the modification request to the other target dataset based at least in part on one or more modifications to the other child dataset.

15. The method of claim 14, further comprising performing, via the one or more computers:
providing, via a guideline comparison interface of the CDMS, user output indicating a first guideline for labeling samples in the other target dataset and a second guideline for labeling samples in the other child dataset.

16. The method of claim 6, further comprising:
periodically initiating audits of a particular dataset in CDMS to validate respective truth labels of samples in the particular dataset.

17. The method of claim 6, further comprising:
performing, via the one or more computers:
providing, via a viewing interface for a particular dataset in CDMS, user output indicating information about the particular dataset including a user rating of the particular dataset; and
responsive to user input received via the viewing interface, updating the user rating of the particular dataset.

18. The method of claim 17, further comprising:
providing, via the viewing interface for the particular dataset, user output indicating information about a fee policy for accessing the particular dataset; and
charging a user for accessing the particular dataset according to the fee policy.

19. One or more non-transitory computer-accessible storage media storing program instructions that when executed on or across one or more processors of a collaborative dataset management system (CDMS), cause the CDMS to:
store in a data repository a plurality of datasets of a plurality of users, wherein datasets of users are made available to other users subject to conditions, and wherein individual ones of the datasets are stored in one or more versions indicating a modification history of the individual datasets;
perform a search for a target dataset of the plurality of datasets in the data repository according to user input associated with a first user and received via a discovery interface of the CDMS, wherein the target dataset is associated with a second user;
create a child dataset for the first user, based at least in part on the target dataset associated with the second user and in accordance with the conditions for the target dataset, in the data repository according to user input received via a creation interface of the CDMS, wherein the child dataset of the first user inherits at least some samples or truth labels of the target dataset associated with the second user;
modify the child a dataset in the data repository based at least in part on user input associated with the first user and received via a collaboration interface of CDMS, wherein the CDMS manages versioning of the child dataset when modifying the child dataset; and
provide the modified child dataset in the data repository over a network to an external system based at least in part on user input received via an access interface of the CDMS, wherein the external system is external to the collaborative dataset management system and configured to perform one or more data processing tasks using the modified child dataset.

20. The one or more non-transitory computer-accessible storage media of claim 19, wherein the program instructions when executed on or across the one or more processors cause the CDMS to:
receive a modification request to another target dataset;
provide, via a review interface of the CDMS, user output indicating one or more samples specified in the modification request and their respective truth labels;
responsive to user input received via the review interface, initiate one or more label audits to validate the respective truth labels and update the review interface with audit results of the one or more label audits; and
responsive to further user input received via the review interface, modify at least some of the truth labels of the one or more samples in the modification request.

* * * * *